United States Patent
Moses et al.

(10) Patent No.: US 7,341,283 B2
(45) Date of Patent: Mar. 11, 2008

(54) HIGH TEMPERATURE FLEXIBLE PIPE JOINT

(75) Inventors: Charles J Moses, Arlington, TX (US);
Michael E Hogan, Arlington, TX (US);
Philip S Moses, Bedford, TX (US);
Todd M Pottorff, Crowley, TX (US);
Carl C Spicer, Arlington, TX (US)

(73) Assignee: Oil States Industries, Inc., Arlington, TX (US)

( * ) Notice: Subject to any disclaimer, the term of this patent is extended or adjusted under 35 U.S.C. 154(b) by 204 days.

(21) Appl. No.: 10/767,587

(22) Filed: Jan. 29, 2004

(65) Prior Publication Data

US 2005/0167978 A1 Aug. 4, 2005

(51) Int. Cl.
*F16L 51/02* (2006.01)
*F16L 27/10* (2006.01)

(52) U.S. Cl. .................... 285/226; 285/49; 285/223

(58) Field of Classification Search ............... 285/223, 285/226, 234, 263, 49
See application file for complete search history.

(56) References Cited

U.S. PATENT DOCUMENTS

| | | | |
|---|---|---|---|
| 2,068,279 A | 1/1937 | Piron | |
| 2,553,636 A | 5/1951 | Dath | |
| 2,873,110 A | 2/1959 | Jonsson | |
| 3,168,334 A | 2/1965 | Johnson | |
| 3,429,622 A | 2/1969 | Lee et al. | |
| 3,434,708 A | 3/1969 | Hawk, Jr. | |
| 3,519,260 A | 7/1970 | Irwin | |
| 3,537,696 A | 11/1970 | Webster, Jr. | |
| 3,679,197 A | 7/1972 | Schmidt | |
| 3,734,546 A | * 5/1973 | Herbert et al. | ........... 285/49 |
| 3,831,922 A | 8/1974 | Appleton | |

(Continued)

FOREIGN PATENT DOCUMENTS

| | | |
|---|---|---|
| EP | 1559940 A1 | 8/2005 |
| EP | 1559941 A1 | 8/2005 |
| GB | 2 113 799 A | 8/1983 |
| GB | 2 160 619 A | 12/1985 |

OTHER PUBLICATIONS

White, Liz; "*Oil fields: tough on elastomers*," Oilfield Uses, ERJ (European Rubber Journal), Dec. 1996, pp. 35-36, 38, Crain Communications Ltd, London, England.

(Continued)

*Primary Examiner*—James M. Hewitt
(74) *Attorney, Agent, or Firm*—Richard C. Auchterlonie; Novak Druce & Quigg, LLP

(57) ABSTRACT

For continuous high temperature operation over a service life in excess of twenty years, a flexible pipe joint includes various features that tend to reduce the temperature of the load-bearing flex element or reduce strain in the warmer elastomeric layers of the flex element. These features include a heat shield of low heat conductivity material integrated into the inner profile of the pipe extension and interposed between the central bore of the pipe joint and the flex element, low heat conductivity metal alloy components between the hot production fluid and the flex element, high temperature resistant elastomer at least in the warmest inner elastomer layer of the flex element, and a flex element constructed to shift strain from the warmer inner elastomer layers to the colder outer elastomer layers by providing greater shear area, different layer thickness, and/or higher elastic modulus elastomer for the warmer inner elastomer layers.

26 Claims, 15 Drawing Sheets

U.S. PATENT DOCUMENTS

| | | | |
|---|---|---|---|
| 3,853,337 | A | 12/1974 | Herbert et al. |
| 3,941,433 | A | 3/1976 | Dolling et al. |
| 3,952,526 | A | 4/1976 | Watkins et al. |
| 3,958,840 | A | 5/1976 | Hickox et al. |
| 4,068,864 | A * | 1/1978 | Herbert et al. ............... 285/49 |
| 4,068,868 | A | 1/1978 | Ohrt |
| 4,076,284 | A | 2/1978 | Herbert et al. |
| 4,098,527 | A * | 7/1978 | Herbert et al. ........... 285/146.3 |
| 4,103,939 | A * | 8/1978 | Herbert et al. ........... 285/123.2 |
| 4,105,266 | A | 8/1978 | Finney |
| 4,121,861 | A | 10/1978 | Gorndt |
| 4,142,833 | A | 3/1979 | Rybicki et al. |
| 4,173,360 | A | 11/1979 | Bergman et al. |
| 4,183,556 | A | 1/1980 | Schwemmer |
| RE30,262 | E | 4/1980 | Schmidt |
| 4,198,037 | A | 4/1980 | Anderson |
| 4,256,354 | A | 3/1981 | Peterson |
| 4,263,243 | A | 4/1981 | Wilson et al. |
| 4,273,363 | A | 6/1981 | Angel |
| 4,295,671 | A | 10/1981 | Clebant |
| 4,324,194 | A | 4/1982 | Elliston |
| 4,362,840 | A | 12/1982 | Tabar et al. |
| 4,406,482 | A | 9/1983 | Clebant |
| 4,416,473 | A | 11/1983 | Lamy et al. |
| 4,432,670 | A | 2/1984 | Lawson |
| 4,458,722 | A | 7/1984 | Dahn |
| 4,489,962 | A | 12/1984 | Caumont et al. |
| 4,491,348 | A * | 1/1985 | Thelen ......................... 285/49 |
| 4,515,399 | A * | 5/1985 | Sullivan et al. ............... 285/95 |
| 4,570,979 | A * | 2/1986 | Moore ......................... 285/223 |
| 4,593,941 | A | 6/1986 | Whightsil, Sr. |
| 4,662,791 | A | 5/1987 | Spicer |
| 4,706,998 | A * | 11/1987 | Peppel et al. ............ 285/146.3 |
| 4,784,410 | A | 11/1988 | Peppel et al. |
| 4,846,509 | A | 7/1989 | Moore |
| 4,881,759 | A | 11/1989 | Kovitch et al. |
| 4,909,327 | A | 3/1990 | Roche |
| 4,984,827 | A | 1/1991 | Peppel et al. |
| 5,133,578 | A | 7/1992 | Whightsil, Sr. et al. |
| 5,141,259 | A * | 8/1992 | Highlen et al. ............... 285/49 |
| 5,269,629 | A | 12/1993 | Langner |
| 5,366,324 | A | 11/1994 | Arlt et al. |
| 5,615,977 | A * | 4/1997 | Moses et al. ............ 405/195.1 |
| 5,905,212 | A * | 5/1999 | Moses et al. .......... 73/862.451 |
| 5,951,061 | A | 9/1999 | Arlt, III et al. |
| 6,346,567 | B1 | 2/2002 | Nozik |
| 6,579,955 | B2 | 6/2003 | Keller et al. |
| 6,646,047 | B2 | 11/2003 | Tasaka et al. |

OTHER PUBLICATIONS

Potter, J.L.; "*The Elastomeric Bearing: What It Can Do For You*," Lord Kinematics, Lord Corporation, presented at the Design Engineering Conference & Show, Philadelphia, PA, Apr. 9-12, 1973, 8 pages, The American Society of Mechanical Engineers, New York, NY.

Herbst, Paul T.; "*Natural rubber as a bearing material for rotary wing aircraft applications*," 1973, 8 pages, Lord Kinematics, Lord Corporation, Erie, PA.

"*SCR FlexJoint®, Feature*," oilstates.com/solutions/offshore/deepwater_installations/SCR/file.asp?id=299, Apr. 30, 2003, 2 pages; Oil States Industries, Arlington, Texas.

"*SCR FlexJoint®, Sizes*," oilstates.com/solutions/offshore/deepwater_installations/SCR/file.asp?id=300, Apr. 30, 2003, 2 pages, Oil States Industries, Arlington, Texas.

"*SCR FlexJoint®—Bellows*," oilstates.com/solutions/offshore/deepwater_ installations/SCR/file.asp?id=301, Apr. 30, 2003, 2 pages, Oil States Industries, Arlington, Texas.

"*SCR FlexJoint®—Installation Sequence*," oilstates.com/solutions/offshore/deepwater_installations/SCR/filed.asp?id=303, Apr. 30, 2003, 5 pages, Oil States Industries, Arlington, Texas.

"*Explosive Decompression*," oilstates.com/solutions/offshore/deepwater_installations/SCR/file.asp?id=304, Apr. 3, 2003, 2 pages, Oil States Industries, Arlington, Texas.

"*Steel Catenary Risers—Attachment Methods*," oilstates.com/solutions/offshore/deepwater_installations/SCR/file.asp?id=306, Apr. 30, 2003, 2 pages, Oil States Industries, Arlington, Texas.

"*Steel Catenary Risers—Lynx Connector*," oilstates.com/solutions/offshore/deepwater_installations/SCR/file.asp?id=307, Apr. 3, 2003, 1 page, Oil States Industries, Arlington, Texas.

"Rubber Technology 101 *Rubber Chemistry*;" rubberdevelopment.com/pages/rubber101.htm, 1999-2000, 4 pages, Rubber Development, Inc., Waverly, Iowa.

"*Materials—Rubber Polymer*," Chart 1, lavelle.com/tech_rbra.html, 2001, 3 pages, Lavelle Industries, Burlington, WI.

"*Materials—Rubber Polymers*;" Chart 2, lavelle.com/tech.rbrb_html, 2001, 3 pages, Lavelle Industries, Burlington, WI.

"*JP, USP & EP Compliant Formulations*;" itran-tompkinsrubber.com/tmaterials.html, 2000, 2 pages, Itran-Tompkins Rubber Corporation, South Plainfield, NJ.

"*Nitrile (Buna-N)*," applerubber.com/sdg/dguide/sec_6/nitrile.cfm, 1999, 2 pages, Apple Rubber Products Inc., Lancaster, NY.

"*Hydrogenated Nitrile Butadiene Rubber (HNBR)—Properties and Applications of Hydrogenated Nitrile Butadiene Rubber*;" azom.com/details.asp?ArticleID=1724; 2003, 3 pages, Azom Pty. Ltd., Warriewood, NSW, Australia.

"*PEEK-HT polymer adds superior high temperature heat performance to Victrex® PEEK polymer portfolio*," victrex.com, 2003, 2 pages; Victrex plc., Lancashire, England.

"*Industrial Market—Vitrex PEEK performance benefit*," victrex.com/uk/markets.asp?id=25, 2003, 2 pages, Victrex plc., Lancashire, England.

Jensen, R.E. et al., "*Analysis of Lightweight Electronic Encapsulant Materials for Smart Munitions Applications*;" Dec. 4, 2002, 23rd Army Science Conference, Orlando, Florida, 2 pages, United States Army Research Laboratory, Aberdeen, MD.

"*Araldite 2014 (AW 139/XB 5323) Heat/Chemical-Resistant Adhesive*;" published before Oct. 7, 2002, 6 pages, Vantico Inc., East Lansing, MI.

"Propylene Glycol," *The Merck Index*, 8th Edition, 1968, pp. 876-877, Merck & Co., Inc., Rahway, NJ.

"*Polyalkylene glycol,*" *Household Products Database*, householdproducts.nlm.nih.gov, May 12, 2005, 1 page, U.S. National Library of Medicine, Bethesda, MD.

"Polyalkylene glycol monobutyl ether," *CHEMINFO*, intox.org, Mar. 9, 2005, 6 pages,Canadian Centre for Occupational Health and Safety, Hamilton, Ontario, Canada.

Wu, B., Reddy, R., and Rogers, R., "Novel Ionic Liquid Thermal Power Storage For Solar Thermal Electric Power Systems," ASME Proceedings of Solar Forum 2001 Solar Energy: The Power to Choose Apr. 21-25, 2001, Washington, DC (7 pages), American Society of Mechanical Engineers, New York, NY.

Popescu, A., "Communication pursuant to Article 96(2) EPC," European Patent Application No. 05,250,439.6-1252, Jan. 23, 2006, 6 pages, European Patent Office, Munich, Germany.

Popescu, A., "Communication pursuant to Article 96(2) EPC," European Patent Application No. 05,250,427.1-1252, Feb. 2, 2006, 5 pages, European Patent Office, Munich, Germany.

"Joint Industry Program for High Temperature FlexJoints®," Oil States Document No. SP1K-23-040, Rev. A, created Jul. 16, 1996, published Aug. 4, 2005, 17 pages, U.S. Appl. No. 10/767,587, U.S. Patent and Trademark Office, Arlington, Virginia.

Hogan, Michael E., et al., "Joint Industry Program High Temperature FlexJoint® Final Report," Oil States Document No. SP1E-23-090 created Sep. 9, 1998, published Aug. 4, 2005, 11 pages, U.S. Appl. No. 10/767,587, U.S. Patent and Trademark Office, Arlington, Virginia.

"Exxon-Erha FlexJoint® Preliminary Design Summary," Oil States Document created Jun. 18, 2001, published Aug. 4, 2005, pp. 1-22, U.S. Appl. No. 10/767,587, U.S. Patent and Trademark Office, Arlington, Virginia.

"Crazyhorse 12-In. Import FlexJoint® Design," Oil States Document created May 10, 2001, published Aug. 4, 2005, pp. 1-28, U.S. Appl. No. 10/767,587, U.S. Patent and Trademark Office, Arlington, Virginia.

"Thermal barrier configuration," Oil States flexible joint summary drawing, Figure 5-53 and Appendix A created Oct. 30, 2002, published Aug. 4, 2005, U.S. Appl. No. 10/767,587, U.S. Patent and Trademark Office, Arlington, Virginia.

Potter, J.L., "The elastomeric 'bearing:' what it can do for you," *Mechanical Engineering*, Dec. 1973, pp. 22-27, The American Society of Mechanical Engineers, New York, NY.

"Oil States Standard FlexJoints®," Apr. 1996, 4 pages, Oil States Industries, Inc., Arlington, TX.

"PEEK," Datasheet, published before Oct. 7, 2002, 10 pages, Victrex plc., Lancashire, England.

"ExxonMobil Approves Thunder Horse Project Funding," RIGZONE.com, Aug. 21, 2002, one page.

European Search Report and Abstract for EP 05 25 0427, Apr. 21, 2005, European Patent Office, The Hague, Netherlands, 4 pages.

European Search Report and Abstract for EP 05 25 0439, Apr. 21, 2005, European Patent Office, The Hague, Netherlands, 5 pages.

*Oil States Industries Flex Joints for TLP Mooring Systems, Drilling and Production Risers;* "Flexibility for Mooring, Drilling and Production Systems;", Continental Emsco Company, 1994, 6 pages.

"Chemlok Adhesives;" Lord Corporation 1997-2004; http://www.lord.com/DesktopDefault.aspx?tabid=261; 2 pages, printed Jan. 26, 2004.

"*Elaster Bonding*;" Lord Corporation 1997-2004; http://www.lord.com/DesktopDefault.aspx?tabid=581; 2 pages, printed Jan. 26, 2004.

"*Adhesive Selector Guide*;" Lord Corporation 2003; 2 pages, printed Jan. 26, 2004.

"*Chemlok Adhesives—A Guide to Handling and Application*;" Application Guide, pp. 1-23 Lord Corporation, 1999, printed Jan. 26, 2004.

"*Transportation Adhesives*;" Rohm and Haas Adhesives and Sealants; http://www.rohmhaas.com/AdhesivesSealants/product_lines/transportation.html; 2 pages, printed Jan. 26, 2004.

"*INCONEL NiCrFe*;" Atlantic Equipment Engineers, 13 Foster Street, Bergenfield, NJ 07621; http://www.micronmetals.com/inconel.html; 2 pages, printed Jan. 27, 2004, 2 pages.

"*TMO Inconel Alloy Data*," Thermostatic Industries, Inc., http://www.thermostatic.com/techdata/inconeldata.shtml, 2003, 2 pages.

\* cited by examiner

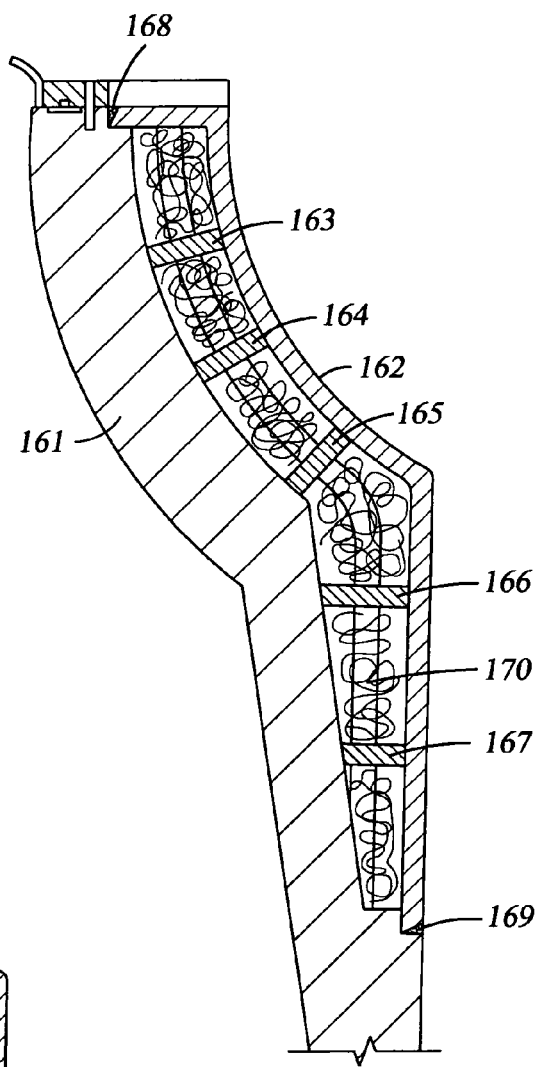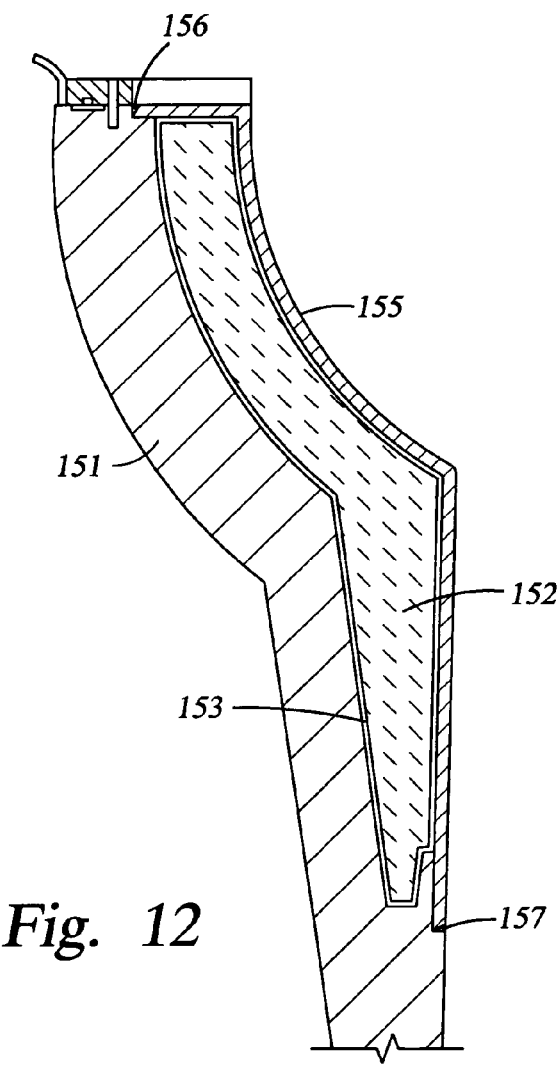

HIGH TEMPERATURE FLEXIBLE PIPE JOINT

BACKGROUND OF THE INVENTION

1. Field of the Invention

The present invention relates to a flexible pipe joint for subsea risers and pipelines, and in particular, such a flexible pipe joint that is capable of long-term operation when subjected to temperatures greater than about 180° F. (82° C.).

2. Description of the Related Art

Offshore production facilities typically use risers constructed of rigid pipe sections and flexible joints for conveying production fluid such as oil or gas from a well on the seabed to a floating offshore production platform. This construction, for example, permits a pipeline to be laid under water and then raised for connection to the offshore production platform.

Typically, a flexible pipe joint has a laminated elastomeric flex element including alternating layers of elastomer and steel plates. The elastomer is bonded to the steel plates and the steel plates are encapsulated in the elastomer. The elastomer is typically vulcanized natural rubber, synthetic rubber, or mixtures of natural and synthetic rubber. Such flexible pipe joints have been designed and manufactured for a service life of at least twenty years under low temperature conditions.

As described in Whightsil, Sr. et al., U.S. Pat. No. 5,133,578, the flexible pipe joint may also include a bellows to isolate the elastomeric flex element from gases in the production fluid. For example, if the elastomer were exposed to high-pressure production fluid containing low molecular weight gasses such as methane, explosive decompression could occur upon sudden release of the high pressure, causing gas molecules captured in the elastomer to expand and cause local ruptures in the elastomer surface.

Recently there has been a need for flexible pipe joints that are capable of long-term operation when subjected to temperatures greater than 180° F. (82° C.). In particular, wells are being drilled into the seabed at depths of more than 1000 meters in the Gulf of Mexico and off the shore of Nigeria. It is desired to use flexible pipe joints in risers for delivering production fluid from the wellhead on the seabed to a floating platform. However, the planned depths of the wells below the seabed and the desired high flow rates would cause the temperature of the production fluid to substantially exceed 180° F. (82° C.). In addition, the ambient seawater temperature is relatively high (80 to 85° F. (27 to 29° C.)). If a conventional flexible pipe joint were used to convey the production fluid, the flex element in the flexible joint would be continually subjected to temperatures in excess of the usual limit of 180° F. (82° C.). This would cause the service life of the conventional flexible pipe joint to be severely degraded. Therefore, there is a desire for a high temperature flexible pipe joint that would have a service life of at least twenty years when conveying production fluid at temperatures considerably in excess of 180° F. (82° C.).

SUMMARY OF THE INVENTION

In accordance with one aspect, the invention provides a high temperature flexible pipe joint. The high temperature flexible pipe joint includes a body, and extension pipe, and a laminated elastomeric flex element coupling the extension pipe to the body. The laminated elastomeric flex element has alternate elastomer layers and reinforcement layers including inner layers near to the extension pipe and outer layers away from the extension pipe. The flex element is constructed to shift strain from the inner elastomer layers to the outer elastomer layers.

In accordance with another aspect, the invention provides a high temperature flexible pipe joint. The high temperature flexible pipe joint includes a body, an extension pipe, and a laminated elastomeric flex element coupling the extension pipe to the body. The laminated elastomeric flex element has alternate elastomer layers and reinforcement layers. The high temperature flexible pipe joint further includes a heat shield disposed in the extension pipe in the vicinity of the laminated elastomeric flex element.

In accordance with yet another aspect, the invention provides a high temperature flexible pipe joint for continuous operation over a service life in excess of twenty years. The high temperature flexible pipe joint includes a body, an extension pipe, and a laminated elastomeric flex element coupling the extension pipe to the body. The laminated elastomeric flex element has alternate elastomer layers and reinforcement layers including inner layers near to the extension pipe and outer layers away from the extension pipe. At least an innermost elastomer layer is made of high temperature resistant elastomeric material, and the laminated elastomeric flex element is constructed to shift strain from the inner elastomer layers to the outer elastomer layers. The high temperature flexible pipe joint further includes a heat shield disposed in the extension pipe in the vicinity of the laminated elastomeric flex element. Moreover, the extension pipe is made of low heat conductivity metal in the vicinity of the laminated elastomeric flex element.

BRIEF DESCRIPTION OF THE DRAWINGS

Other objects and advantages of the invention will become apparent upon reading the following detailed description with reference to the accompanying drawings wherein:

FIG. 12 shows an alternative construction for heat shielding in a high temperature flexible pipe joint;

FIG. 13 shows another alternative construction for heat shielding in a high temperature flexible pipe joint;

Figure 1:
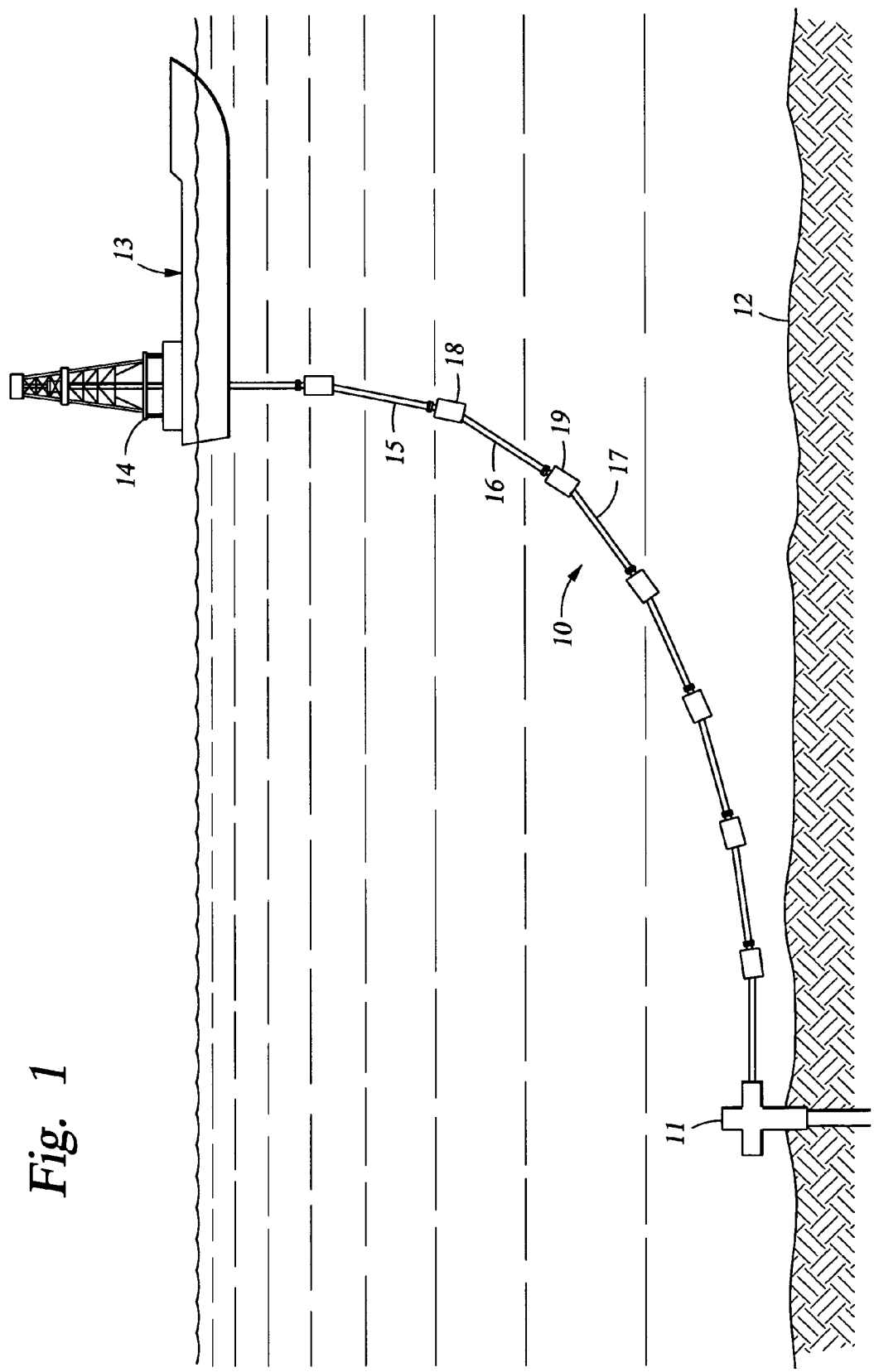
FIG. 1 shows the use of high temperature flexible pipe joints of the present invention for conveying production fluid from a wellhead on a seabed to a floating production storage and offloading facility (FPSO)

While the invention is susceptible to various modifications and alternative forms, specific embodiments thereof have been shown by way of example in the drawings and will be described in detail. It should be understood, however, that it is not intended to limit the invention to the particular forms disclosed, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a steel catenary riser (SCR) generally designated 10 for conveying production fluid such as oil or gas from a well head 11 on the sea bed 12 to a floating production storage and offloading facility (FPSO) 13. The FPSO 13 is essentially a supertanker provided with a derrick 14 capable of deploying and retrieving drill strings and risers to and from the seabed 12. The steel catenary riser 10 is comprised of steel pipe sections e.g. 15, 16, 17 interconnected by flexible pipe joints 18, 19.

For a well that has been drilled very far below the seabed 12, the production fluid issuing from the wellhead 11 may considerably exceed 180° F. (82° C.) especially for very high flow rates. For example, the maximum production fluid temperatures expected for high flow rates from deep offshore wells currently being drilled are generally in the range of 240° F. (115° C.) to 265° F. (130° C.), and it is not inconceivable that future offshore wells could have production fluid temperatures as high as 350° F. (177° C.). Depending on the temperature of the production fluid, the ambient seawater temperature, the flow rate of the production fluid, and characteristics of the production fluid such as its heat capacity and viscosity, and the configuration and properties of the materials in the flexible pipe joint, the high temperature production fluid may cause the elastomeric flex element in a flexible pipe joint to be subjected to a temperature in excess of its continuous operation design temperature limit for a desired service life.

In the worst case, continuously subjecting an elastomeric flex element in a flexible joint to a temperature above its design temperature limit could lead to a failure of the elastomeric flex element before the end of its service life. Typically the elastomeric flex element functions as a pressure seal as well as a flexible bearing. Therefore, a failure of the elastomeric flex element due to excessive temperature exposure could cause an undesired spill of production fluid in addition to a need for shutting down production during replacement of the flexible joint.

In practice, if flexible pipe joints are not available for handling the high production fluid temperatures that would result from high flow rates from deep offshore wells, it may not be possible to obtain the desired high flow rates from the wells. Instead, the flow rate would need to be restricted to limit the production fluid temperature to the highest temperature that could be continuously tolerated by the flexible pipe joint over its desired service life.

Figure 2:
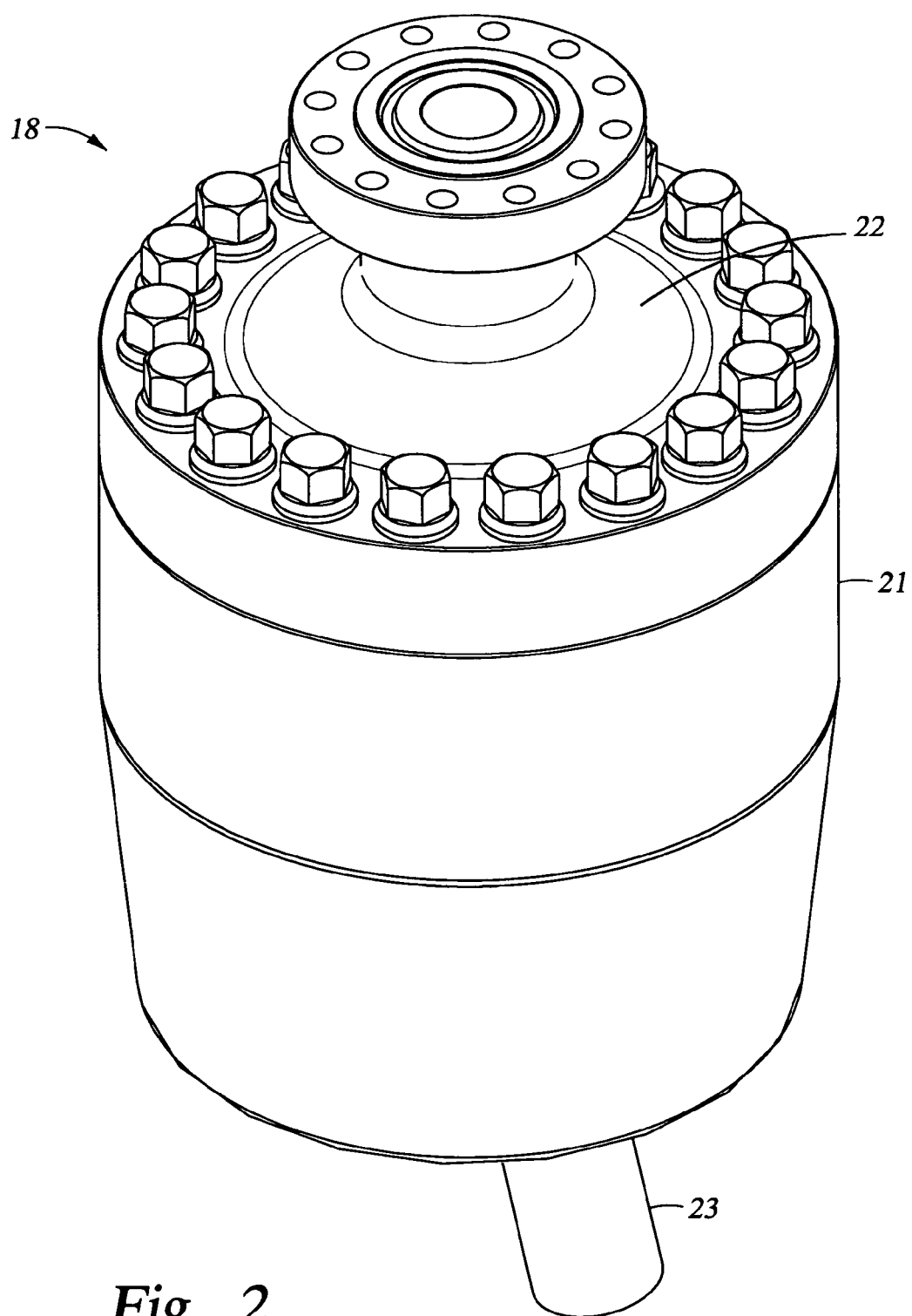
FIG. 2 shows an example of a high temperature flexible pipe joint in accordance with the present invention.

FIG. 2 shows an external view of a high temperature flexible pipe joint 18 that has a variety of features for achieving a conventional service life when subjected to high temperature production fluid. The flexible pipe joint 18 includes a cylindrical body 21, an attachment flange bolted to an upper end of the body, and an extension pipe 23 depending from the body. The flexible pipe joint 18 could be made to handle various production fluid pressures and flow rates. For example, a standard kind of pipe is known as 12 inch high-pressure pipe capable of handling at least 10,000 psi. To join such 12-inch high-pressure pipe, the flexible pipe joint 18 may have an inner bore diameter of 9.6 inches (24.4 cm), a 13.5 inch (34.3 cm) outer diameter of extension pipe, a maximum outer diameter of 62 inches (157 cm), and a height of 82.5 inches (210 cm) (excluding the length of the extension pipe). The extension pipe 23 has a maximum angular deflection of ± 17 degrees with respect to the body 21. The extension pipe 23 can support a maximum axial tension of 1,500 kips, and provide an extreme angle deflection stiffness of about 15 to 40 kips per degree. The body 21, attachment flange 22, and the portion of the extension pipe 23 depending from the body are preferably made of ASTM A707 steel. ASTM 707 is a high-strength, low carbon steel that resists hydrogen embrittlement from hydrogen sulfide, and does not require welds to be stress relieved after welding.

Figure 3:
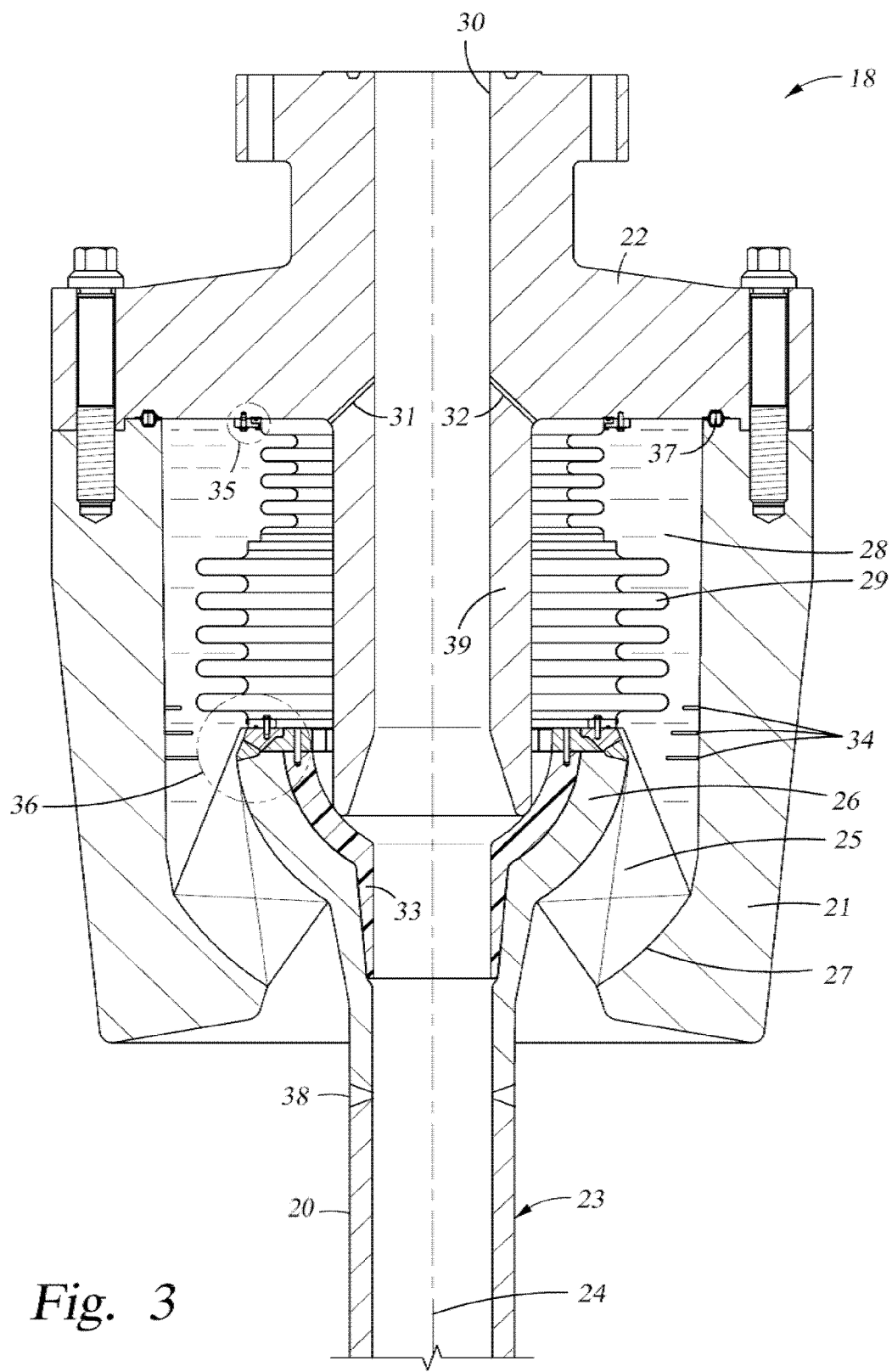
FIG. 3 is a lateral cross-section of the high temperature flexible pipe joint of FIG. 2.

FIG. 3 is a lateral cross-section of the high temperature flexible pipe joint 18. The flexible pipe joint has radial symmetry with respect to a longitudinal axis 24, which is the central axis of a bore 30 in the attachment flange 22. The axis 24 is also the central flow line of production fluid when production fluid flows through the flexible pipe joint. The flexible pipe joint has a laminated elastomeric flex element 25 interposed between an upper semispherical portion of the pipe extension 23 and an internal seat 27 in the body 21. The internal seat 27 is annular and symmetric about the central axis 24, and has a spherically curved surface that is complementary to the semispherical portion 26 of the pipe extension 23. A metal seal ring 37 such as an API BX gasket ensures pressure sealing of the attachment flange 22 to the body 21.

In operation, the production fluid flowing up the pipe extension 23 and through the bore 30 is pressurized, and a relatively incompressible fluid 28 in an annular cavity within the body 21 is also pressurized. The fluid 28 should have a higher boiling point than the maximum steady-state temperature of the production fluid. In order to prevent mixing of the relatively incompressible fluid 28 with the production fluid, a bellows 29 is secured between the semispherical portion 26 of the pipe extension 23 and the attachment flange 22, and the bellows encloses a cylindrical extension 39 of the attachment flange. At least four holes 31, 32 are drilled through the cylindrical extension 30 so that the internal pressure within the bellows 29 is substantially equal to the production fluid pressure. The lower half of the bellows 29 has a relatively large diameter and the upper half of the bellows has a relatively small diameter so that any substantial pressure difference between the production fluid and the relatively incompressible fluid 28 within the body 21 is equalized by upward or downward movement of the middle portion of the bellows 29.

Although the primary purpose of the bellows 29 is to prevent damage to the elastomer in the event of explosive decompression of the production fluid, the bellows also functions as a heat shield by shielding the elastomeric flex element 25 from the hot production fluid.

In a conventional flexible joint using a bellows, the inner annular cavity is typically filled with a non-corrosive glycol-based fluid, such as an aqueous propylene glycol solution. At high temperatures, however, propylene glycol slowly breaks down to acid. For high temperature operation, a polyalkylene glycol solution is preferred, such as Union Carbide UCON brand heat transfer fluid No. 500.

In order to shield the upper semispherical portion of the pipe extension 26 from the production fluid, a heat shield 33 is seated within the upper end of the pipe extension. The heat shield 33 includes a hemispherical portion mating with an inner profile of the hemispherical portion 26 of the extension pipe, and the heat shield 33 also includes a cylindrical portion extending into the cylindrical portion of the extension pipe 23. The heat shield 33 contacts the lower end of the cylindrical extension 39 of the attachment flange 22, and this contact places the flex element 25 in an initial state of compression before assembly of the flexible pipe joint 18 into a riser.

In order to further reduce the flow of heat from the production fluid to the elastomeric flex element 25, the upper portion 26 of the extension 23 and also the bellows 29 can be made of low heat conductivity metal such as nickel-chromium-iron alloy. The preferred nickel-chromium-iron alloy is Inconel brand alloy, which contains a minimum of 72% nickel and cobalt, 14-17% chromium, and 6-10 iron, such as 76% nickel, 17% chromium, and 7% iron. For example, a weld 38 attaches the Inconel alloy upper portion 26 of the pipe extension 23 to the lower portion 20 made of ASTM A707 steel.

As further shown in FIG. 3, a series of annular baffles 34 can be secured to the inner cylindrical surface of the body 21 to set up a favorable convective flow pattern in the fluid 28. This flow pattern promotes the transfer of heat from the bellows 29 to the body 21 and from the flex element 25 to the body 21 without promoting the transfer of heat from the bellows 29 to the flex element 25. The surface area of the baffles 34 also promotes transfer of heat from the fluid 28 to the body 21 near a relatively high temperature region of the elastomer flex element 25.

Figure 4:
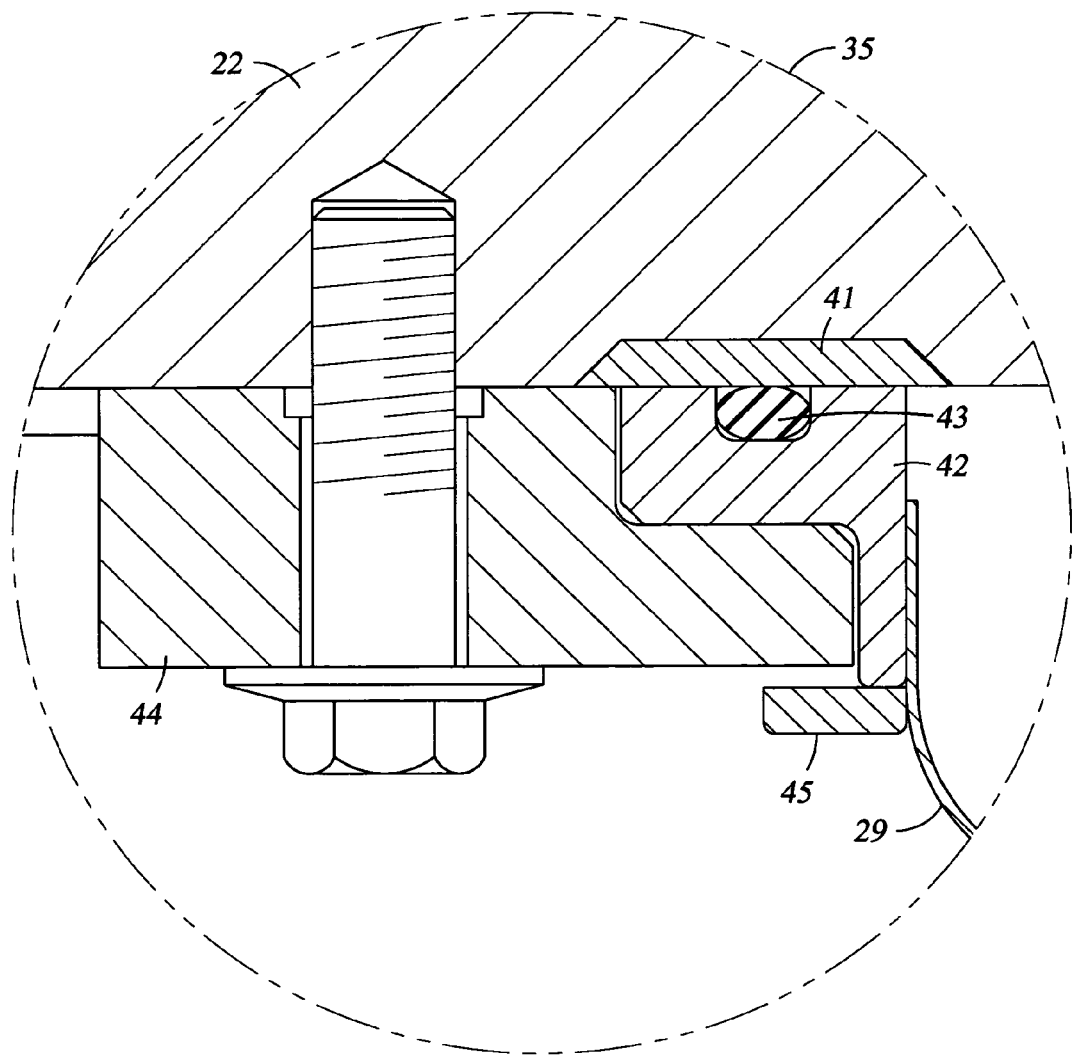
FIG. 4 is a magnified view of an upper bellows seal area in FIG. 3.

FIG. 4 is a magnified view of an upper bellows seal area 35 in FIG. 3. The lower surface of the attachment flange has an annular groove filled with relatively soft metal seat 41 that makes a metal-to-metal seal with an upper ring 42 of the bellows 29. A seal ring 43 is received in a groove in the ring 42 and is held against the seat 41. The seal ring 43, for example, is made of temperature resistant rubber such as peroxide cured hydrogenated nitrile butadiene rubber (HNBR). The ring 42 is held in place by a clamping ring 44 bolted to the attachment flange 22. To facilitate assembly, a ring 45 is fastened to the upper ring 42 of the bellows to retain the clamping ring 44 in close proximity to the upper ring 42 of the bellows.

Figure 5:
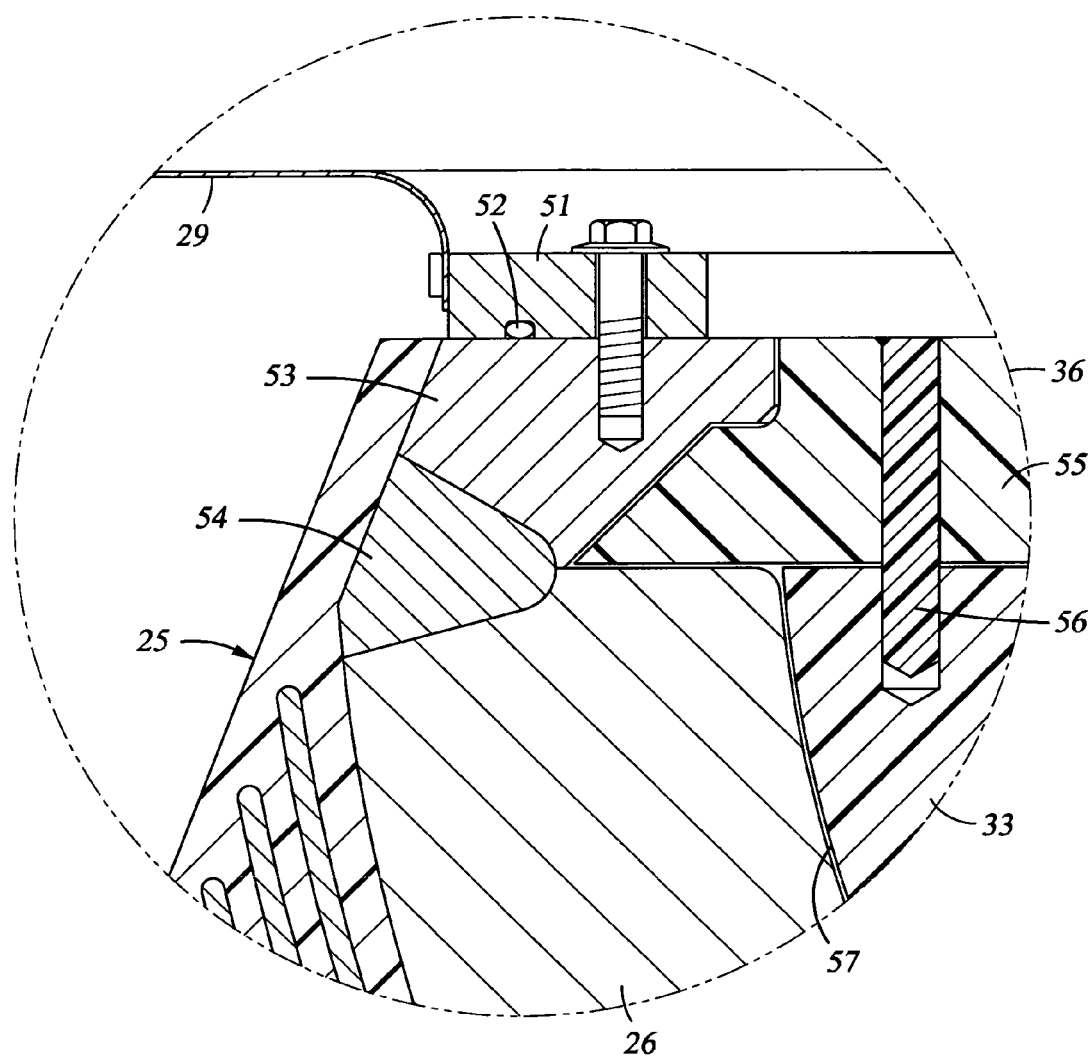
FIG. 5 is a magnified view of a lower bellows seal area in FIG. 3.

FIG. 5 is a magnified view of a lower bellows seal area 36 in FIG. 3. The bellows 29 has a lower ring 51 having an annular groove containing a seal ring 52. The seal ring 52, for example, is made of temperature resistant rubber such as peroxide cured hydrogenated nitrile butadiene rubber (HNBR). The lower ring 51 is bolted to a retaining ring 53 secured by a weld 54 to the semispherical upper portion 26 of the extension pipe. The lower ring 51 and the retaining ring 53 can be made of low heat conductivity metal such as Inconel alloy.

The retaining ring 53 retains a multi-section lock ring 55 fitted over the heat shield 33. Force-fitted pins 56 connect the sections of the multi-section lock ring 55 to the heat shield 33. In addition, a layer of adhesive 57 bonds the heat shield 33 and the multi-section lock ring 55 to the semispherical upper portion 26 of the extension pipe. The adhesive 57 is a high temperature epoxy such as Araldite 2014 from Ciba Specialty Chemicals Corporation. Araldite 2014 is produced by Vantico Inc., 4917 Dawn Ave., East Lansing, Mich. 48823.

Preferably the heat shield 33 is made of polyetheretherketone (PEEK) reinforced with 30 percent of randomly-oriented chopped glass fiber. This amount of chopped glass fiber reduces creep to acceptable limits when the heat shield 33 is exposed to high temperature production fluid of at least 235° F. (113° C.). The lock ring 55 and pins 56 are made of the same PEEK material. The PEEK material, for example, is grade 450GL30 produced by Victrex plc, at Hillhouse International, Thornton Cleveleys, Lancashier, FY5 4QD England. The PEEK material is compression molded to appropriate dimensions. In addition, the mating surfaces of the heat shield 33 and the upper portion 26 of the pipe extension are machined for a close fit.

Instead of PEEK, the heat shield 33 could be made from polytetrafluoroethylene such as TEFLON brand polytetrafluoroethylene. The heat shield in combination with the other heat reduction features of FIG. 3 should reduce the maximum temperature of the elastomeric flex element to 200° F. (93° C.) for a 220° F. (104° C.) production fluid temperature and an ambient seawater temperature of 85° F. (47° C.).

Figure 6:
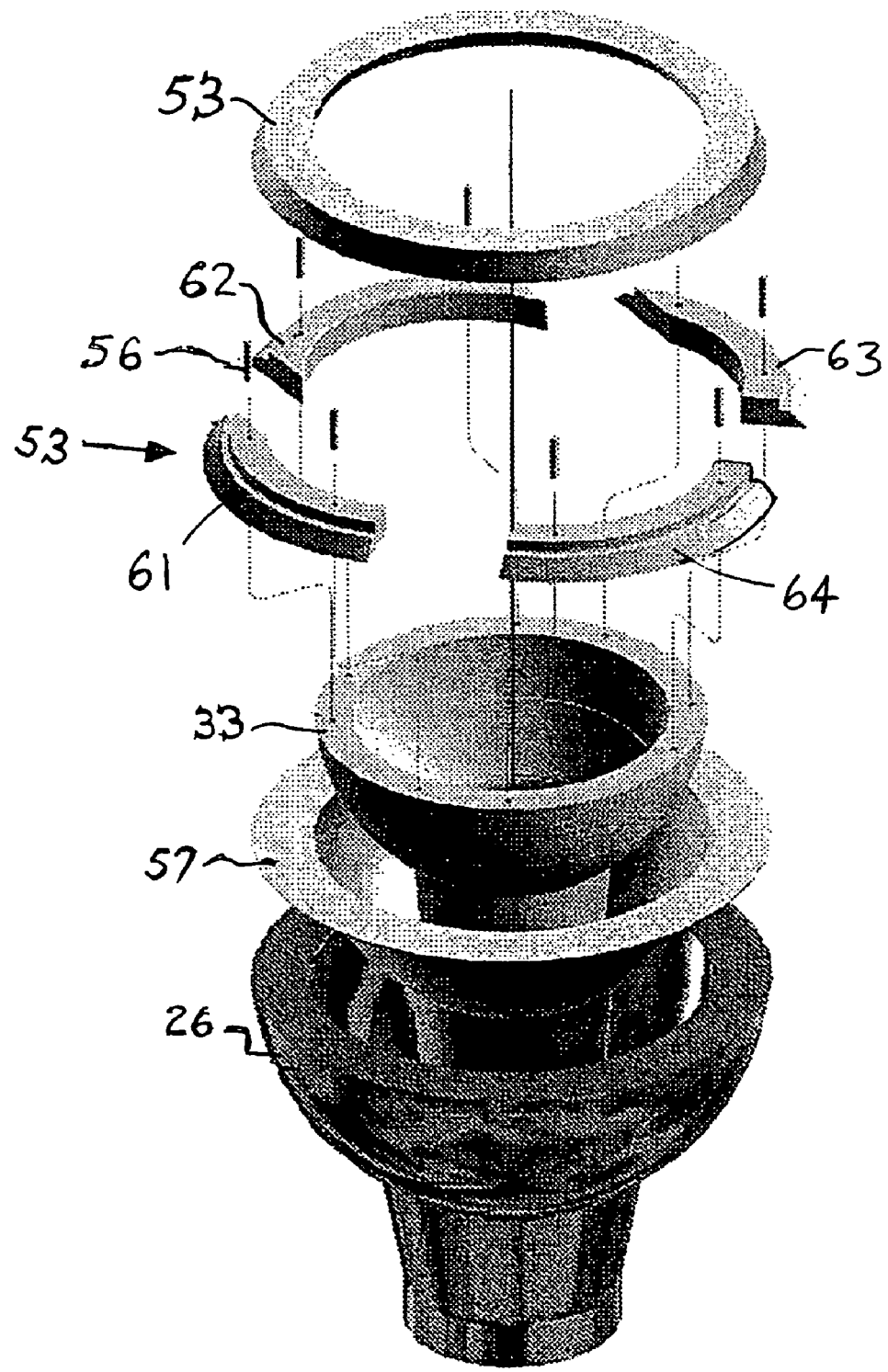
FIG. 6 is an exploded view of components in a heat shield disposed between a riser extension and an elastomeric flex element in FIG. 3.

FIG. 6 is an exploded view of the components associated with the heat shield 33. The multi-section lock ring 55 includes four sections 61, 62, 63, 64, and two respective pins connect each section to the heat shield 33.

Figure 7:
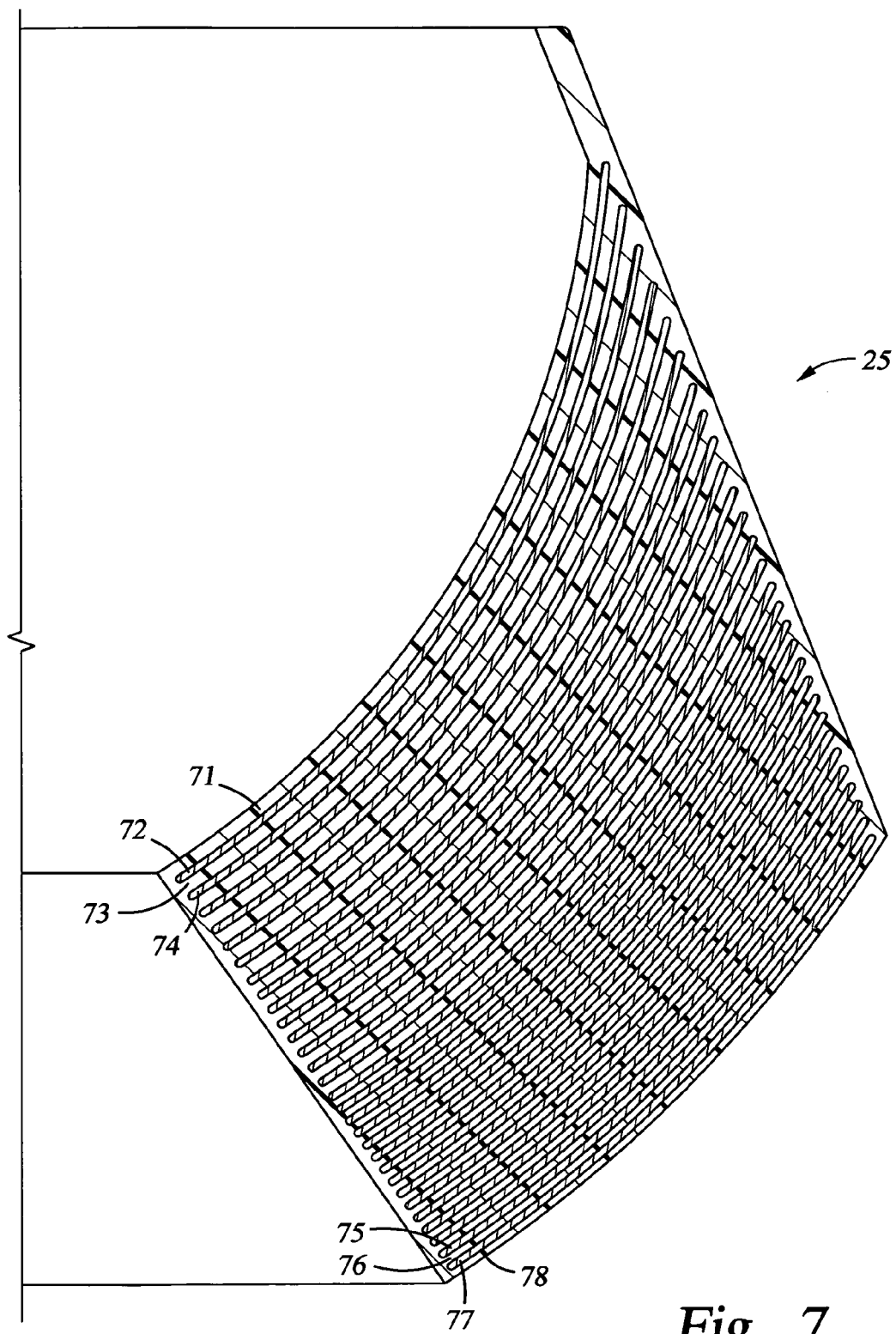
FIG. 7 shows an enlarged cross-section of the elastomeric flex element in FIG. 3.

FIG. 7 shows the alternate elastomer layers 71, 73, 76, 78 and steel reinforcing layers 72, 74, 75, 77 of the elastomeric flex element 25. The elastomer layer 71 is the layer that is bonded to the semispherical upper portion (26 in FIG. 3) of the extension pipe, and the elastomer layer 78 is the layer that is bonded to the seat (27 in FIG. 3) of the body. Therefore, when conveying high temperature production fluid in a subsea environment, there will be a temperature gradient across the elastomeric flex element 25. The elastomer layer 71 will have the highest temperature, and the elastomer layer 78 will have the lowest temperature. This temperature gradient is non-uniform, such that the higher temperatures are concentrated in the first few inner elastomer layers 71, 73. The increased temperature reduces the modulus of the elastomer, and the reduced modulus reduces internal stress and extends fatigue life.

Despite the modulus-induced softening of the inner elastomer layers, it is desired to keep the elastomer shear strain substantially uniform across the elastomeric flex element 25 during use of the flexible joint. It is also desired to keep the elastomer shear strain below a design limit such as 200% for extreme bending of the pipe extension with respect to the body. Moreover, there is an advantage for the inner elastomer layers 71, 73, to be thicker than the outer elastomer layers 76, 78. Thicker inner elastomer layers act as a heat shield for the outer elastomer layers due to the relatively low heat conductivity of the elastomer. Thicker inner elastomer layers may also reduce the direct shear strain on the elastomer.

In view of these considerations, it is preferred to use a relatively high modulus elastomer compound for the initial inner layers 71, 73, an increased number of elastomer layers and metal reinforcements in comparison to a conventional flex element handling the same loads, an increased elastomer thickness for the initial inner layers in comparison to the outer layers 76, 78, and a greater shear area than is conventional for the initial inner layers.

For example, the elastomeric flex element 25 has an inner spherical radius of 16 inches (40.6 cm) and an outer spherical radius of 25 inches (63 cm). The elastomeric flex element 25 has metal reinforcements having a thickness in the range of 0.15 to 0.20 inches (3.8 to 5 mm), and elastomer layers having a thickness in the range of 0.07 to 0.20 inches (1.8 to 5 mm). All of the metal reinforcements can have the same thickness. Preferably the thickness of the elastomer layers varies over a range of about 30% to 50% with thicker inner layers and thinner outer layers.

For example, the elastomeric flex element 25 has thirty elastomer layers and twenty-nine steel reinforcements. All of the metal reinforcements have the same thickness. All of the seven innermost elastomer layers have the same thickness and the same nominal shear modulus (i.e., the modulus at room temperature) of 250 psi. All of the eight middle elastomer layers have the same thickness and the same nominal shear modulus of 220 psi. All of the fifteen outermost elastomer layers have the same thickness and the same nominal shear modulus of 200 psi. The thickness of the middle elastomer layers is the average of the thickness of the innermost elastomer layers and the outermost elastomer layers.

The elastomeric flex element 25 has a greater shear area for the inner elastomer layers 71, 73, than is conventional due to the relatively large surface area of the inner elastomer layer 71 in contact with the upper portion 26 of the pipe extension in comparison to the surface area of the outer elastomer layer 78 in contact with the internal seat 17 of the body 21 (see FIG. 3).

Figure 8:
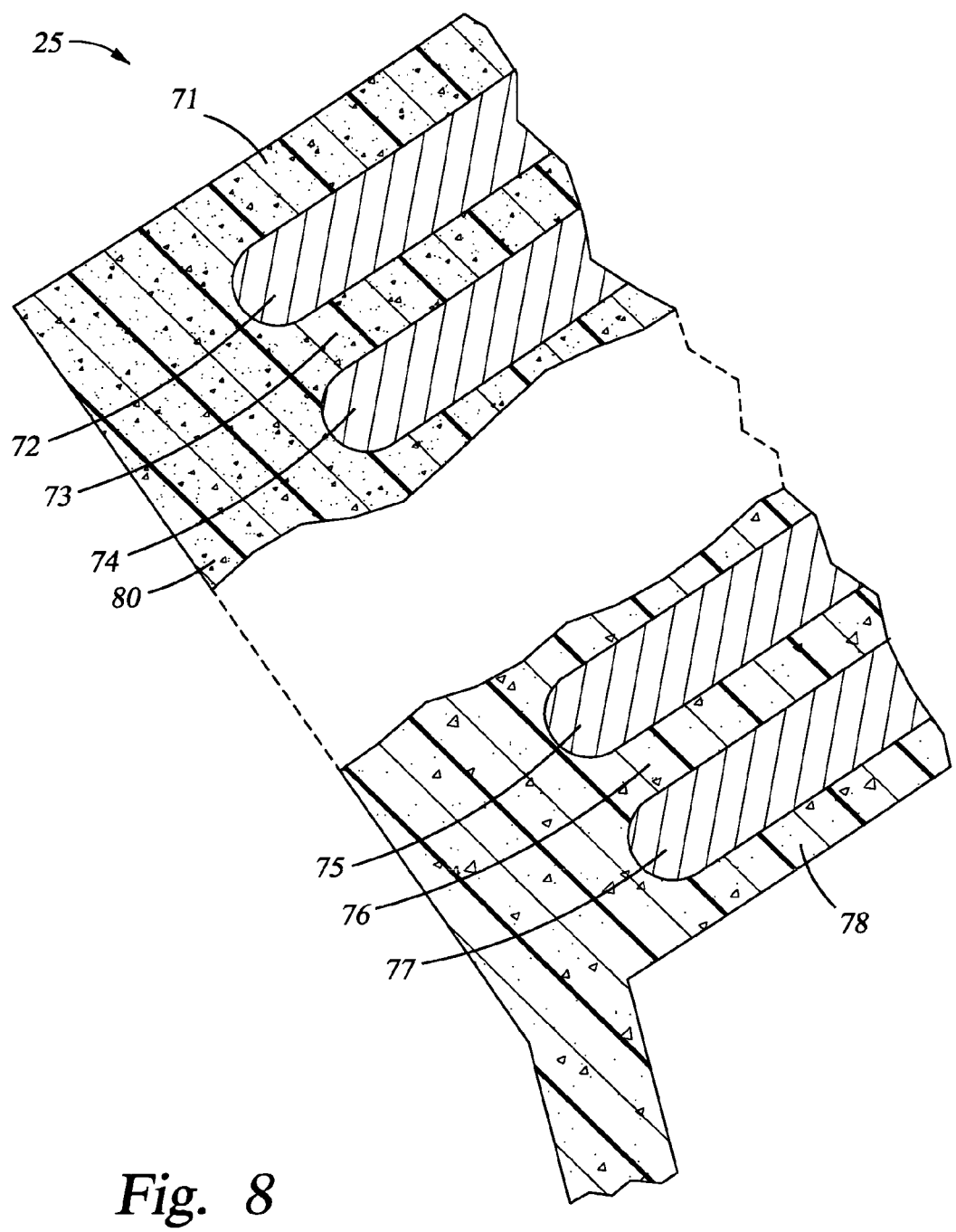
FIG. 8 shows an enlargement of the cross-section in FIG. 7.

The modulus of the elastomer is selected by adjusting the amount of carbon black and/or silica filler in the elastomer. The modulus can be adjusted over about a three to one range by adjusting the amount of carbon black and/or silica filler from about 5 parts per hundred to 55 parts per hundred. The modulus is lowered by decreasing the amount of filler. For nitrile butadiene rubber (NBR), carbon black in the range of about 40 to 45 parts per hundred is used to obtain the modulus of 200 to 250 psi. As shown in FIG. 8, for example, the inner elastomer layers 71, 73 have a good amount of carbon black filler particles 80, and the outer elastomer layers 76, 78 have a lesser amount of carbon black filler particles. The thickness of the inner elastomer layers 71, 73 is greater than the thickness of the outer elastomer layers 76, 78.

There may be some situations where it would be desirable to make the inner elastomer layers thinner than the outer elastomer layers. This may occur if there would be a pressure constraint due to the combination of production fluid pressure, riser tension, and maximum extension pipe deflection angle, that would require thin inner elastomer layers to prevent rupturing of the inner elastomer layers at the extreme inner or outer edges of these layers, especially at the extreme inner elastomer edges of these inner elastomer layers at the elastomer-seawater interface.

The high temperature flexible pipe joint as described above with reference to FIGS. 2 to 8 can be fabricated in the following sequence. The metal forgings, a flex element mold, bellows 29, heat shield components 33, 53, 56, bolts and miscellaneous hardware are ordered from selected vendors, who fabricate these components to supplied drawings. The elastomeric material is also ordered from a supplier. The forging for the extension pipe 23 is received, inspected, and internally clad with Inconel alloy. The Inconel retainer ring 53 is then welded to the upper end 26 of the extension pipe. The heat shield components 33, 53, 56 are received, inspected, and installed in the upper end of the extension pipe using high temperature epoxy and cured under vacuum. All of the metals are then cleaned and prepared for the molding and assembly process. The elastomeric flex element 25 is built up using high temperature elastomer compounds and forged steel reinforcements. The flex element, the body 21 and the extension 23 are assembled into the mold, and the assembly is placed in a horizontal press. The flex element is then molded in contact with the body and the extension and cured by heat and pressure. After curing, the assembly of the flex element, body and extension are removed from the mold, inspected, and painted with a rust inhibiting paint. This assembly is tested for stiffness at ambient temperature without pressure. Once this test is passed, the bellows 29 is attached to the upper end 26 of the extension pipe, the bellows is attached to the attachment flange 22, the incompressible fluid 28 is added, and then the attachment flange is bolted to the body. The flexible pipe joint is then pressure tested to its maximum design limit.

Figure 9:
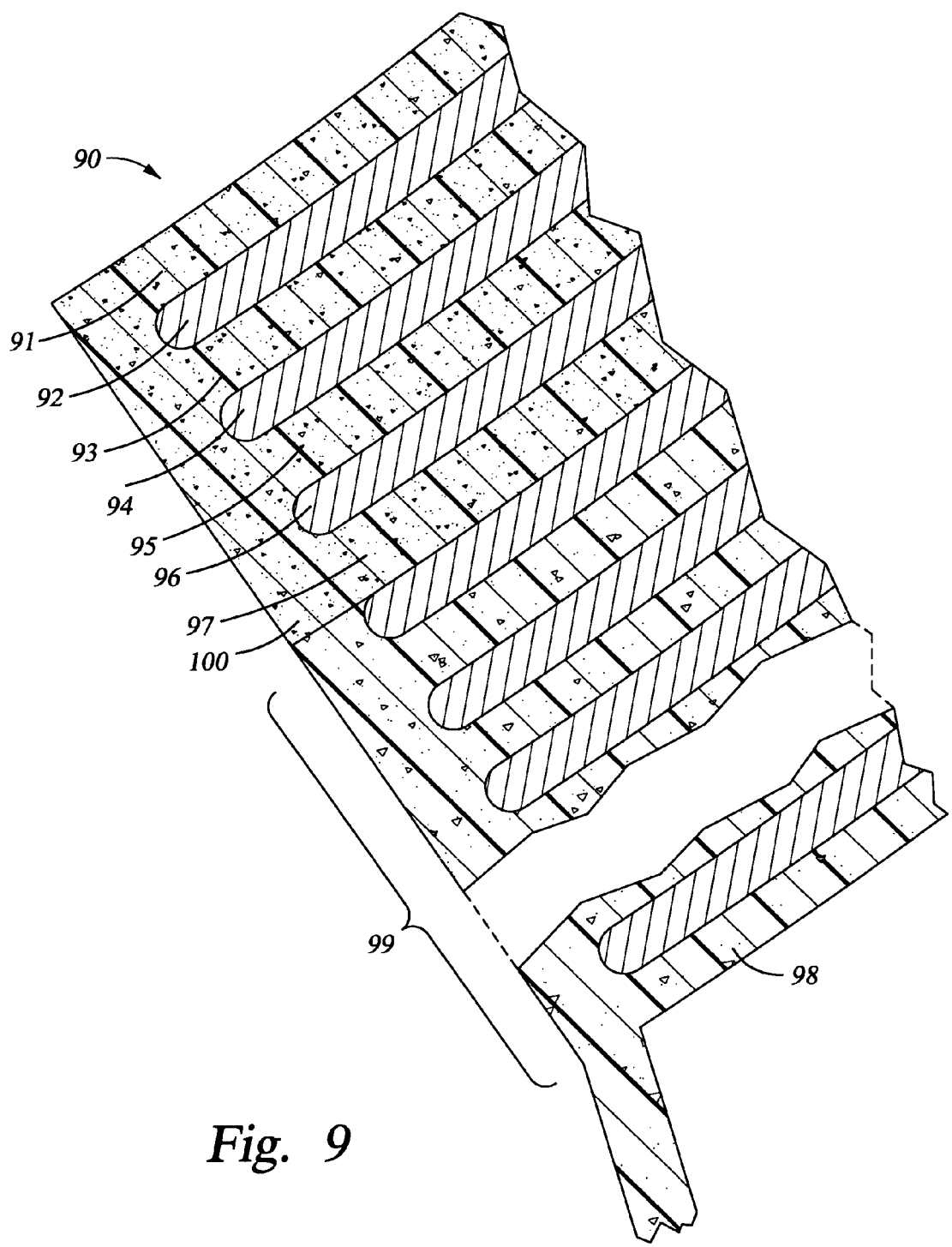
FIG. 9 shows an alternative construction for the elastomeric flex element in which two different kinds of elastomer are used in the flex element.

The flexible pipe joint as described above could be modified in various ways. As shown in FIG. 9, for example, the inner elastomer layers 91, 93, 95, and 97 could have a composition 100 that is different from the composition of the outer layers 99. For example, the inner elastomer layers could be made of peroxide-cured hydrogenated nitrile butadiene rubber (HNBR), and the outer elastomer layers could be made of semi-efficient or conventionally vulcanized nitrile butadiene rubber (NBR).

It is desirable to use elastomeric compounds that provide greater temperature tolerance at least for the inner elastomer layers 71, 73. For example, conventional flexible joints are typically made of vulcanized natural rubber compositions or vulcanized nitrile butadiene rubber compositions. In general, heat aging and compression set resistance of vulcanized rubber compositions can be increased by using efficient vulcanization, at the expense of low temperature crystallization resistance and higher extension ratios. Efficient vulcanization creates a cured elastomer having a high ratio of monosulfidic crosslinks to poly and disulfidic crosslinks, for example, four times as many monosulfidic crosslinks than poly and disulfidic crosslinks. An example of efficient vulcanization for increasing the temperature tolerance of natural rubber compositions is given in Nozik U.S. Pat. No. 6,346,567, incorporated herein by reference. In a similar fashion, efficient vulcanization of nitrile butadiene rubber can be used for fabricating the flex element 25 shown in FIGS. 7 and 8. This should provide long-term temperature resistance for elastomer temperatures up to about 200° F. (93° C.).

There are various kinds of elastomer that have published continuous temperature tolerance that is better than natural or nitrile butadiene rubber. However, the published continuous temperature for heat resistance of an elastomer usually refers to retention of elastomer properties such as shear modulus over at most hundreds of hours. The published continuous temperature resistance over hundreds of hours does not quantify the continuous temperature resistance over a service life of twenty years. The published values are useful, however, for comparison between different kinds of elastomer to identify those kinds that may be most useful in increasing the temperature tolerance of the elastomeric flex element. In general, testing is needed to quantify the continuous maximum temperature that is permissible over a service life of twenty years for any particular kind of elastomer.

In general, to increase the permissible operating temperature for a conventional elastomeric flexible joint simply by substituting an elastomer of higher temperature tolerance, the elastomer must have a number of properties that cannot be substantially degraded over the desired service life. These properties include elastomer tensile strength, modulus softening resistance, fatigue resistance, creep resistance, and strength of the elastomer-metal bond between the elastomer layers and the metal reinforcements. Also, it is desired for the elastomer to be chemically resistant to hydrocarbon production fluid, in order to prevent rapid failure of the elastomeric flex element in case production fluid would leak through the bellows or upper or lower bellows seal into the inner annulus and come into contact with the elastomeric flex element. For example, nitrile butadiene rubber (NBR), hydrogenated nitrile butadiene rubber (HNBR), and fluroelastomer all have excellent resistance to hydrocarbon production fluid. Most silicone elastomers have poor resistance to hydrocarbon production fluid.

Peroxide cured hydrogenated nitrile butadiene rubber (HNBR) has increased high temperature tolerance over NBR. Testing with peroxide cured HNBR, however, revealed a fabrication problem with a large flex element that was not observed with a smaller flex element. In particular, fabrication of a HNBR flex element for a 12 inch high temperature flexible joint had a problem of uniform bonding of the elastomer to the metal reinforcements.

For natural rubber and nitrile butadiene rubber, there are a number of bonding agents for producing elastomer-metal bonds that retain bond strength at high temperatures. One such bonding agent is Chemlock 205/TY-PLY-BN produced by Lord Corporation, 2000 W. Grandview Blvd., P.O. Box 10038, Erie, Pa. Another is Thixon P-6-EF primer and 532-EF adhesive produced by Rohm and Haas Company, 100 Independence Mall West, Philadelphia, Pa. 19106. For example, the metal reinforcements are prepared by solvent cleaning, then abrasive blasting, then further solvent cleaning, then applying primer, and then applying adhesive. The prepared metal reinforcements are then placed in a mold with elastomer mix. The mold is pressurized and cured at 250° F. (121° C.) for 70 min.

There are some temperature resistant elastomers that have very good temperature resistance but have relatively poor bonding to metal, such as some fluroelastomers. There are also some temperature resistant elastomers that are so new that adhesive systems have yet to be developed or sufficiently tested to ensure retention of sufficient bond strength under high temperature conditions over a desired twenty-year service life. An example of a relatively new high temperature elastomer is linear poly-silarylene-siloxane-acetylene as described in Keller U.S. Pat. No. 6,579,955, incorporated herein by reference.

To some degree, the physical configuration of the elastomeric flex element can be altered to compensate for a deficiency in some of the desired properties of the temperature resistant elastomer, such as poor bonding or poor strain resistance. For example, the strain in most fluroelastomers should be limited to about 30 percent.

Figure 10:
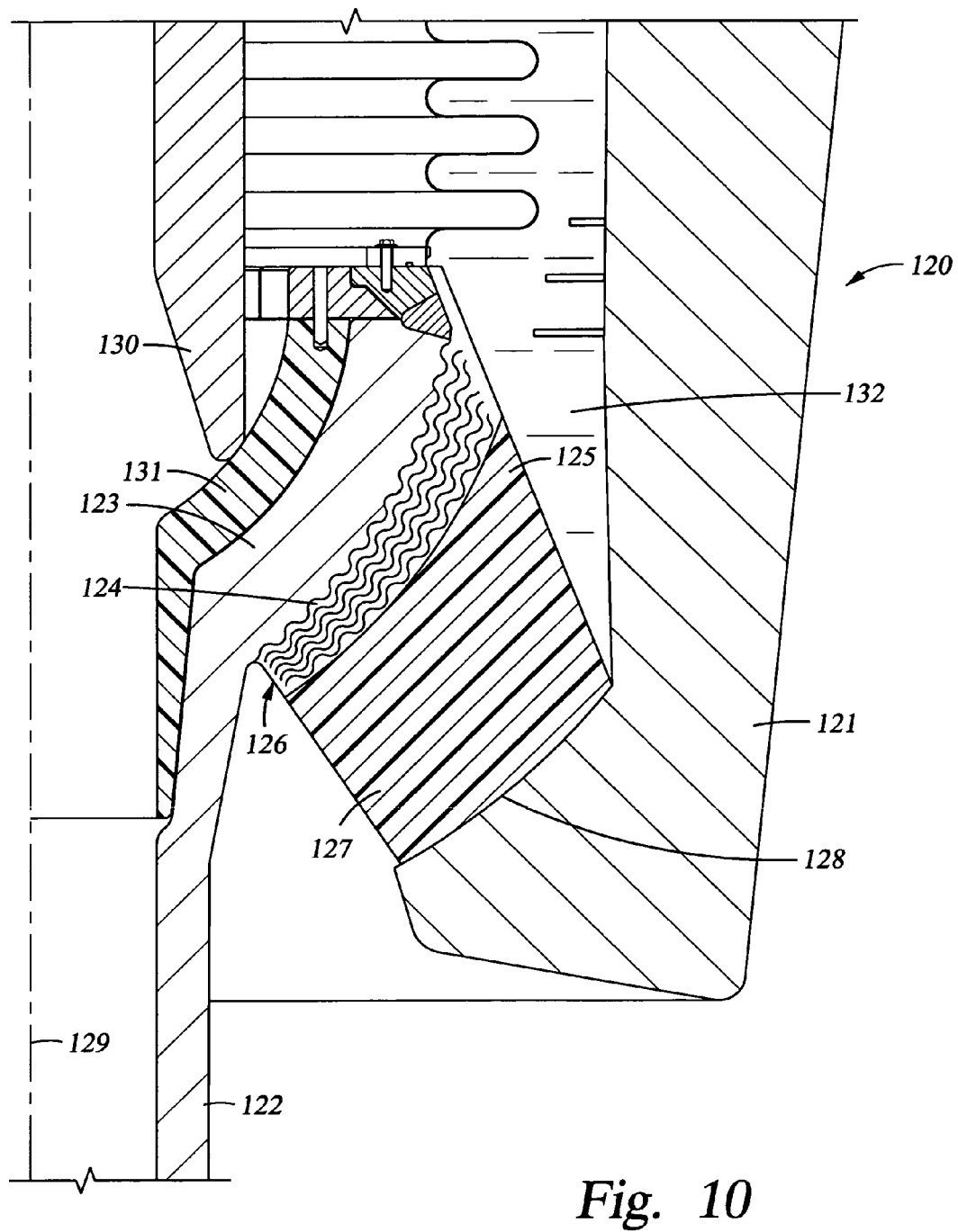
FIG. 10 shows an alternative construction for a flexible pipe joint for using temperature resistant elastomer that exhibits poor bonding to metal at high temperature or has a low stain limit at high temperature.

FIG. 10 shows an alternative high temperature flexible pipe joint 120 that may use a temperature resistant elastomer that has relatively poor elastomer to metal bonding or poor strain resistance. The flexible pipe joint 120 has a body 121 and an extension pipe 122. The extension pipe 122 has an upper semispherical portion 123 having an outer surface 124 mating with an elastomeric flex element 125 resting on an inner seat 128 of the body 121. The elastomeric flex element has an inner high temperature portion 126 and an outer low temperature portion 127. The inner high temperature portion 126 is comprised of alternate layers of temperature resistant elastomer and metal reinforcement rings. The outer surface 134 of the upper portion 123 of the pipe extension 122 is formed with concentric circular corrugations about the longitudinal axis 129 of the pipe extension. The flexible pipe joint 120 has an inner attachment flange extension 130 that contacts a heat shield 131 to put the elastomeric flex element 125 in an initial state of compression and thus maintain a good seal between the external environment and substantially incompressible fluid 132 inside the body 121.

Figure 11:
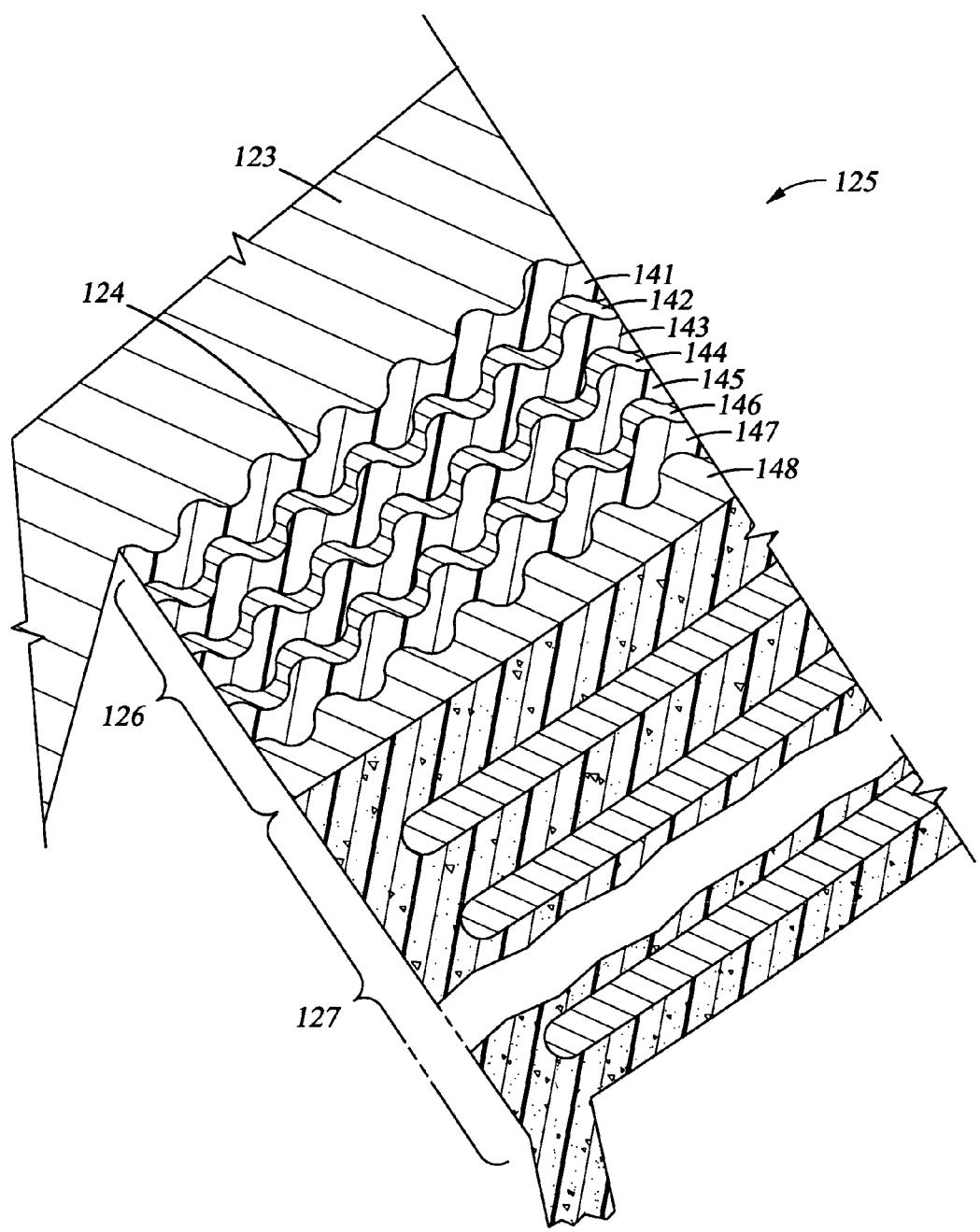
FIG. 11 shows an enlarged cross-section of the elastomeric flex element in FIG. 10.

As more clearly seen in FIG. 11, the alternate layers of temperature resistant elastomer 141, 143, 145, 147 such as fluroelastomer, and metal reinforcing rings 142, 144, 146, 148 of the high temperature portion 126 of the elastomeric flex element 125 are also corrugated or pocketed to conform to the corrugations on the outer surface of the upper portion 123 of the pipe extension. The elastomer layers and reinforcements could be corrugated or pocketed in various ways different from the example shown in FIG. 11; for example, the reinforcements could have a waffle-iron configuration. When biased in a compressive state, the corrugations or pockets permit shear forces to be transmitted between the corrugated elastomer and metal layers 141 to 148 without adhesive bonding between these layers. The corrugated or pocketed structure also provides greater shear area in order to make the high temperature portion 126 of the elastomeric flex element relatively stiff and limit the strain on the high temperature elastomer layers relative to the stiffness and strain on the low temperature elastomer layers in the low temperature portion 127 of the elastomeric flex element. The low temperature portion 127 of the elastomeric flex element may have a conventional construction and may use low temperature elastomer such as vulcanized nitrile butadiene rubber (NBR).

FIG. 12 shows an alternative construction for heat shielding of the upper portion 151 of an extension pipe in a high temperature flexible pipe joint. The heat shielding includes low heat conductivity ceramic material 152 such as silica or ceramic fiber that is fused together. Such ceramic material is capable of withstanding considerable compressive force but it is not suitable for direct contact with the lower end of the inner extension of an attachment flange (39 in FIG. 3). Therefore, the entire outer surface of the ceramic material 152 is coated with high temperature epoxy 153 and bonded between an outer metal cover 155 and the inner surface of the upper portion 151 of the pipe extension. The outer metal cover 155 is then welded to the upper portion of the pipe extension at an upper location 156 and at a lower location 157. Preferably, the outer metal cover 155 is made of low heat conductivity metal such as Inconel alloy.

FIG. 13 shows another alternative construction for heat shielding of the upper portion 161 of an extension pipe in a high temperature flexible pipe joint. In this case, there is a good deal of "dead space" between the upper portion 161 of the extension pipe and a metal cover 162. A number of metal reinforcing rings 163, 164, 165, 166, and 167 transmit compressive force from the cover 162 to the upper portion of 161 of the extension pipe. The cover 162 is welded to the upper portion of the pipe extension at an upper location 168 and a lower location 169. The cover 162 and the reinforcing rings 163 to 167 are made of low heat conductivity metal such as Inconel alloy. The dead space between the upper portion 161 of the extension pipe and the metal cover 162 includes a number of cavities that could be filled with gas or evacuated to reduce convective heat transmission. Moreover, as shown in FIG. 16, packing the dead space with layers of heat reflective metal foil and fiberglass insulation 170 could reduce heat transmission through the dead space.

Figure 14:
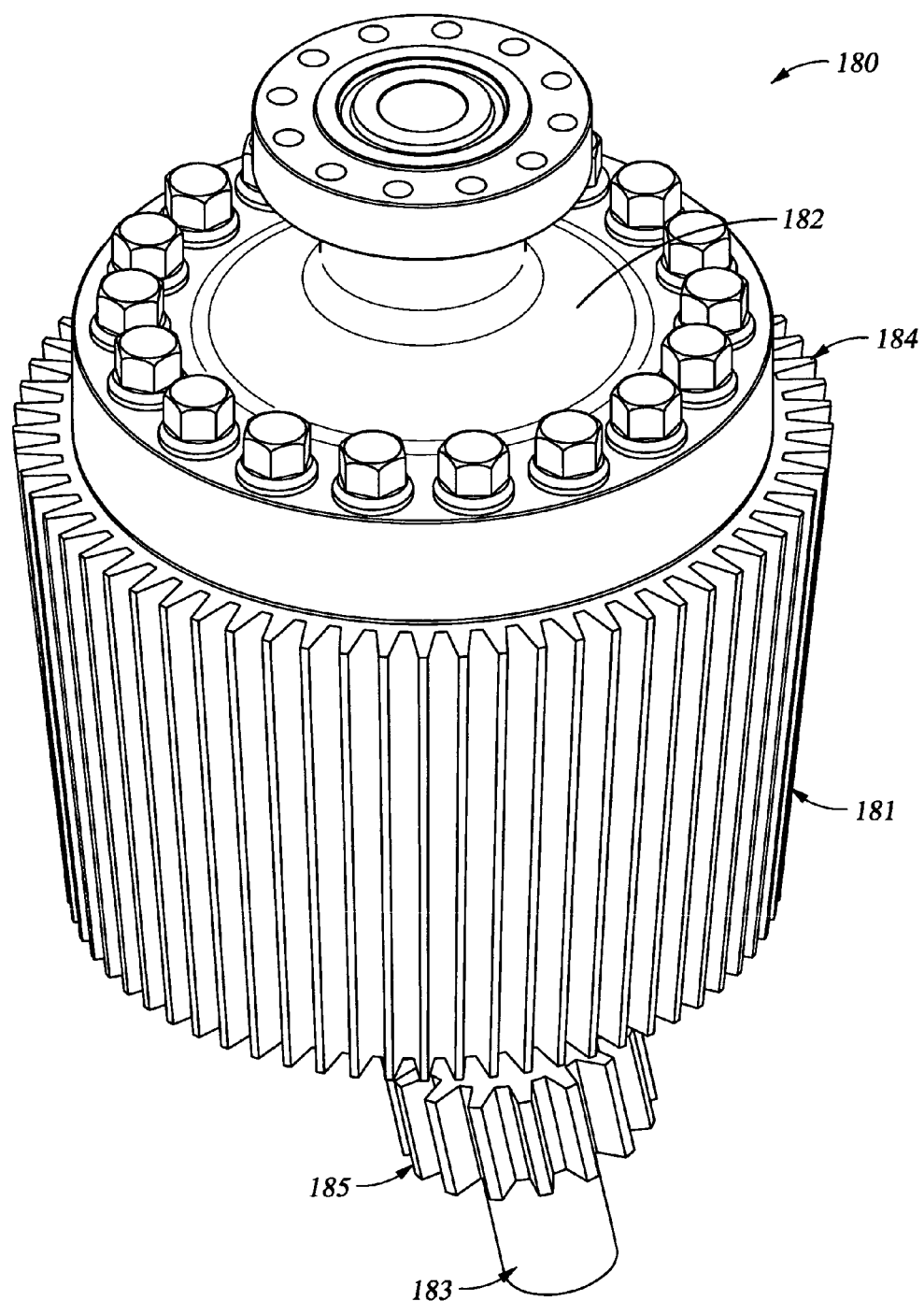
FIG. 14 shows an alternative construction for a high temperature flexible pipe joint having a finned body for enhanced heat transfer to the ambient seawater environment.

Another way of reducing the temperature of the elastomeric flexible joint is to reduce the thermal resistance of the path through the body from the relatively incompressible fluid in the inner annulus to the external seawater environment. For example, FIG. 14 shows a high temperature flexible pipe joint 180 having a body 181, an attachment flange 182, and an extension pipe 183. The body 181 is formed with an array of external fins 184 about its outer circumference for dissipation of heat from the body 181 to the external seawater environment. A set of fins 185 are also attached around the extension pipe 183. The fins 185 around the extension pipe 183 not only help cool the extension pipe but may also stir up some circulation of seawater during flexing of the extension pipe 183 relative to the body 181, and this circulation may help cool the bottom of the body 181.

Figure 15:
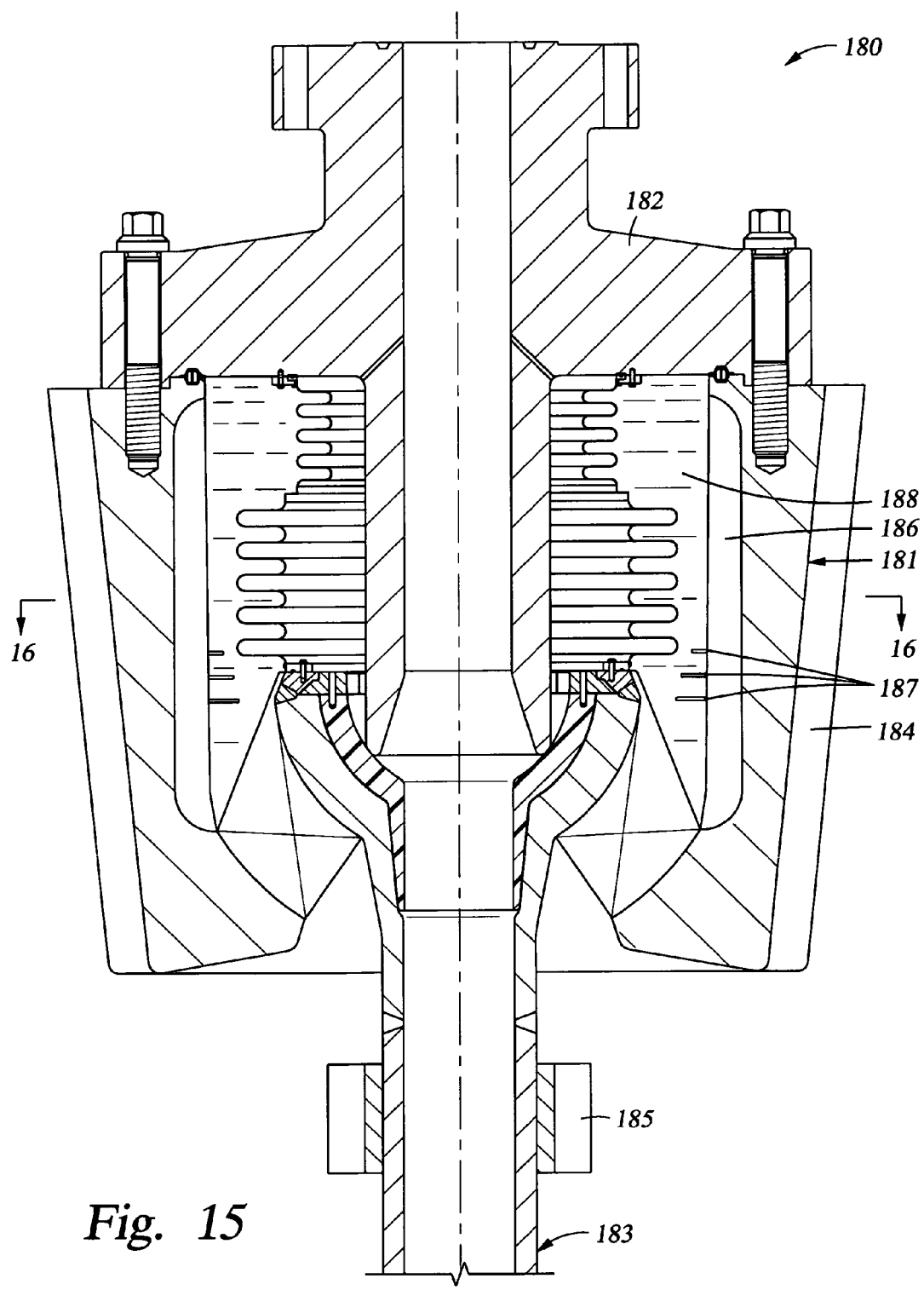
FIG. 15 is a lateral cross-section of the high temperature flexible pipe joint in FIG. 14.
Figure 16:
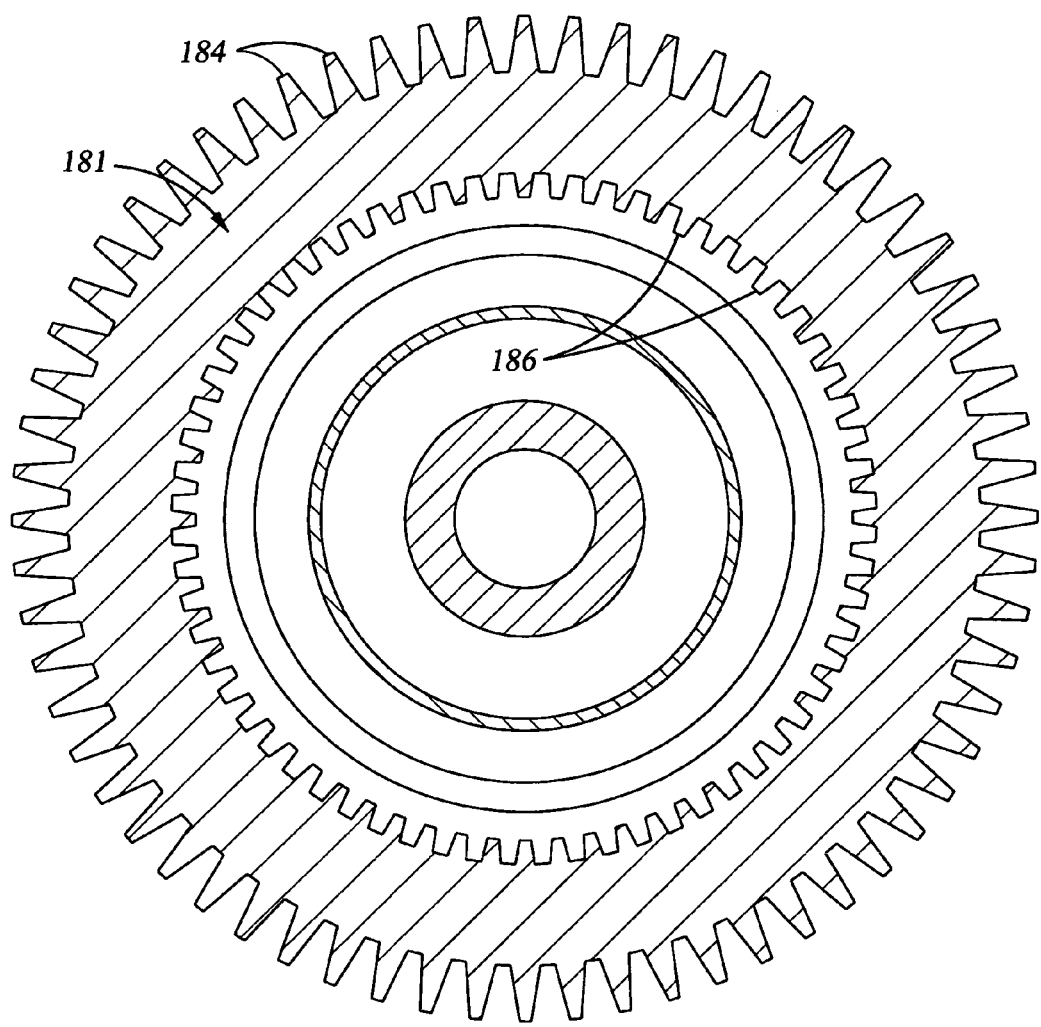
FIG. 16 is a transverse cross-section along section line 16-16 in FIG. 15.

As further shown in FIG. 15 and FIG. 16, the inner surface of the body 181 is milled to form internal fins 186 that promote the transfer of heat from the incompressible fluid 188 in the inner annulus to the body 181. As best seen in FIG. 15, the internal fins also support baffles 187 that organize convective currents in the fluid 188. Propelling seawater across the external fins 184 and 185 could provide additional cooling of the body 181 or the extension pipe 183. It would also be possible to form channels in the body 181 and pump coolant through the channels to reduce the temperature of the body below the temperature of the seawater environment.

In view of the above, there has been described a flexible pipe joint having a combination of feature that permit continuous high temperature operation over a service life in excess of twenty years. These features contribute to a significant reduction in the steady-state temperature of the load-bearing flex element or strain reduction in the warmer elastomeric layers of the flex element. These features include a heat shield of low heat conductivity material (polymeric, ceramic, etc.) or gaseous filled or vacuum cavity integrated into the inner profile of the pipe extension and interposed between the central bore of the pipe joint and the elastomeric flex element. Low heat conductivity metal alloy components replace standard steel components that act as a proximate interface between the hot production fluid and the flex element. The elastomeric flex element may include high temperature resistant elastomer at least in an inner layer of the flex element proximate to the hot production fluid. The elastomeric flex element may also shift the burden of alternating strain from the warmer inner elastomer layers to the colder outer elastomer layers by providing greater shear area, different layer thickness, and/or higher elastic modulus elastomer composition for the warmer inner elastomer layers. A bellows typically provided for preventing damage to the flex element during any explosive decompression also provides shielding of the elastomeric flex element from the hot production fluid. This bellows can be made of low heat conductivity metal. The internal annular cavity around the bellows can be filled with a commercially available, relatively incompressible, high temperature stable fluid.

What is claimed is:

1. A flexible pipe joint for conveying production fluid greater than 180° F. in a subsea environment, the flexible pipe joint comprising:
   a body;
   an extension pipe;
   a laminated elastomeric flex element coupling the extension pipe to the body, the laminated elastomeric flex element having alternate elastomer layers and reinforcement layers, the elastomer layers including inner elastomer layers near to the extension pipe and outer elastomer layers away from the extension pipe, wherein the inner elastomer layers have greater shear area than the outer elastomer layers and the inner elastomer layers have a higher shear modulus than the outer elastomer layers to shift strain from the inner elastomer layers to the outer elastomer layers; and
   a heat shield disposed in the extension pipe in the vicinity of the laminated elastomeric flex element;
   wherein the heat shield includes non-metallic material inserted into the extension pipe and a multi-section ring engaging the extension pipe and disposed over the non-metallic material inserted into the extension pipe for retaining the non-metallic material inserted into the extension pipe.

2. The flexible pipe joint as claimed in claim 1, which includes at least one force-fitted pin disposed in a section of the multi-section ring and in the non-metallic material inserted into the extension pipe.

3. The flexible pipe joint as claimed in claim 1, wherein the multi-section ring is disposed under a metal retaining ring welded to the extension pipe.

4. A flexible pipe joint for conveying production fluid greater than 180° F. in a subsea environment, the flexible pipe joint comprising:
   a body;
   an extension pipe;
   a laminated elastomeric flex element coupling the extension pipe to the body, the laminated elastomeric flex element having alternate elastomer layers and reinforcement layers, the elastomer layers including inner elastomer layers near to the extension pipe and outer elastomer layers away from the extension pipe, wherein the inner elastomer layers have greater shear area than the outer elastomer layers and the inner elastomer layers have a higher shear modulus than the outer elastomer layers to shift strain from the inner elastomer layers to the outer elastomer layers; and
   a heat shield disposed in the extension pipe in the vicinity of the laminated elastomeric flex element;
   wherein the extension pipe has a hemispherical portion in the vicinity of the laminated elastomeric flex element and a cylindrical portion away from the laminated elastomeric flex element, the heat shield includes a hemispherical portion mating with an inner profile of the hemispherical portion of the extension pipe, and the heat shield includes a cylindrical portion extending into the cylindrical portion of the extension pipe.

5. A flexible pipe joint for conveying production fluid greater than 180° F. in a subsea environment, the flexible pipe joint comprising:
   a body;
   an extension pipe; and
   a laminated elastomeric flex element coupling the extension pipe to the body, the laminated elastomeric flex element having alternate elastomer layers and reinforcement layers, the elastomer layers including inner elastomer layers near to the extension pipe and outer elastomer layers away from the extension pipe, wherein the inner elastomer layers have greater shear area than the outer elastomer layers and the inner elastomer layers have a higher shear modulus than the outer elastomer layers to shift strain from the inner elastomer layers to the outer elastomer layers;

wherein the body contains a bellows secured to an end of the extension pipe within the body, the body defines an inner annulus about the bellows, and the inner annulus is filled with a substantially incompressible fluid; and which includes at least one baffle attached to the body and extending into the inner annulus in the vicinity of the bellows and the laminated elastomeric flex element.

6. A flexible pipe joint for conveying production fluid greater than 180° F. in a subsea environment, the flexible pipe joint comprising:

a body;

an extension pipe; and a laminated elastomeric flex element coupling the extension pipe to the body, the laminated elastomeric flex element having alternate elastomer layers and reinforcement layers, the elastomer layers including inner elastomer layers near to the extension pipe and outer elastomer layers away from the extension pipe, wherein the inner elastomer layers have a higher shear modulus than the outer elastomer layers to shift strain from the inner elastomer layers to the outer elastomer layers; and a heat shield disposed in the extension pipe in the vicinity of the laminated elastomeric flex element:

wherein the heat shield includes non-metallic material inserted into the extension pipe and a multi-section ring engaging the extension pipe and disposed over the non-metallic material inserted into the extension pipe for retaining the non-metallic material inserted into the extension pipe.

7. The flexible pipe joint as claimed in claim 6, which includes at least one force-fitted pin disposed in a section of the multi-section ring and in the non-metallic material inserted into the extension pipe.

8. The flexible pipe joint as claimed in claim 6, wherein the multi-section ring is disposed under a metal retaining ring welded to the extension pipe.

9. A flexible pipe joint for conveying production fluid greater than 180° F. in a subsea environment, the flexible pipe joint comprising:

a body;

an extension pipe; and a laminated elastomeric flex element coupling the extension pipe to the body, the laminated elastomeric flex element having alternate elastomer layers and reinforcement layers, the elastomer layers including inner elastomer layers near to the extension pipe and outer elastomer layers away from the extension pipe, wherein the inner elastomer layers have a higher shear modulus than the outer elastomer layers to shift strain from the inner elastomer layers to the outer elastomer layers; and a heat shield disposed in the extension pipe in the vicinity of the laminated elastomeric flex element;

wherein the extension pipe has a hemispherical portion in the vicinity of the laminated elastomeric flex element and a cylindrical portion away from the laminated elastomeric flex element, the heat shield includes a hemispherical portion mating with an inner profile of the hemispherical portion of the extension pipe, and the heat shield includes a cylindrical portion extending into the cylindrical portion of the extension pipe.

10. A flexible pipe joint for conveying production fluid greater than 180° F. in a subsea environment over a service life in excess of twenty years, the flexible pipe joint comprising:

a body;

an extension pipe;

a laminated elastomeric flex element coupling the extension pipe to the body, the laminated elastomeric flex element having alternate elastomer layers and reinforcement layers including inner elastomer layers near to the extension pipe and outer elastomer layers away from the extension pipe, wherein the laminated elastomeric flex element is constructed to shift strain from the inner elastomer layers to the outer elastomer layers; and a heat shield disposed in the extension pipe in the vicinity of the laminated elastomeric flex element;

wherein the extension pipe is made of nickel-chromium-iron alloy in the vicinity of the laminated elastomeric flex element, wherein the body contains a bellows secured to an end of the extension pipe within the body, the body defines an inner annulus about the bellows, and the inner annulus is filled with a substantially incompressible fluid, and which includes at least one baffle attached to the body and extending into the inner annulus in the vicinity of the bellows and the laminated elastomeric flex element.

11. A flexible pipe joint for conveying production fluid greater than 180° F. in a subsea environment, the flexible pipe joint comprising:

a body having a cavity;

a central pipe within the cavity and mounted to the body;

an extension pipe extending outward from the cavity of the body;

a laminated elastomeric flex element disposed within the cavity of the body and coupling the extension pipe to the body, the laminated elastomeric flex element having alternate elastomer layers and reinforcement layers; and a heat shield disposed in the extension pipe in the vicinity of the laminated elastomeric flex element;

wherein the extension pipe has a hemispherical portion in the vicinity of the laminated elastomeric flex element and a cylindrical portion away from the laminated elastomeric flex element, the heat shield includes polymeric material, the polymeric material is disposed between the extension pipe and an end portion of the central pipe, the polymeric material includes a hemispherical portion mating with an inner profile of the hemispherical portion of the extension pipe and a cylindrical portion extending into the cylindrical portion of the extension pipe, and the polymeric material contacts the end portion of the central pipe to place the laminated elastomeric flex element in an initial state of compression.

12. The flexible pipe joint as claimed in claim 11, wherein the elastomer layers include inner elastomer layers near to the extension pipe and outer elastomer layers away from the extension pipe, wherein the inner elastomer layers have a greater shear modulus than the outer elastomer layers.

13. The flexible pipe joint as claimed in claim 11, wherein the elastomer layers include inner elastomer layers near to the extension pipe and outer elastomer layers away from the extension pipe, the inner elastomer layers consist essentially of peroxide cured hydrogenated nitrile butadiene rubber, and the outer elastomer layers consist essentially of vulcanized nitrile butadiene rubber.

14. The flexible pipe joint as claimed in claim 11, wherein the elastomer layers include inner elastomer layers near to the extension pipe and outer elastomer layers away from the extension pipe, the inner elastomer layers consist essentially of fluroelastomer, and outer elastomer layers consist essentially of vulcanized nitrile butadiene rubber.

15. The flexible pipe joint as claimed in claim 11, wherein the reinforcement layers include inner reinforcement layers near to the extension pipe and outer reinforcement layers away from the extension pipe, and the inner reinforcement layers are corrugated or pocketed.

16. The flexible pipe joint as claimed in claims 11, wherein the polymeric material is polyetheretherkeytone reinforced with glass fiber.

17. The flexible pipe joint as claimed in claim 11, which further includes a multi-section ring engaging the extension pipe and disposed over the polymeric material for retaining the polymeric material in the extension pipe.

18. The flexible pipe joint as claimed in claim 17 which includes at least one force-fitted pin disposed in a section of the multi-section ring and in the polymeric material.

19. The flexible pipe joint as claimed in claim 17, wherein the multi-section ring is disposed under a metal retaining ring welded to the extension pipe.

20. The flexible pipe joint as claimed in claim 11, wherein the hemispherical portion of the extension pipe is made of nickel-chromium-iron alloy.

21. The flexible pipe joint as claimed in claim 11, wherein the body contains a bellows secured to an end of the extension pipe within the body, the body defines an inner annulus about the bellows, and the inner annulus is filled with a substantially incompressible fluid.

22. The flexible pipe joint as claimed in claim 21, wherein the substantially incompressible fluid is a polyalkylene glycol solution.

23. The flexible pipe joint as claimed in claim 21, wherein the bellows is made of nickel-chromium-iron alloy.

24. The flexible pipe joint as claimed in claim 21, which includes at least one baffle attached to the body and extending into the inner annulus in the vicinity of the bellows and the laminated elastomeric flex element.

25. The flexible pipe joint as claimed in claim 21, wherein the body has internal fins that protrude into the inner annulus.

26. The flexible pipe joint as claimed in claim 11, wherein the body has external fins for dissipation of heat from the body.

* * * * *